(12) United States Patent
Toda et al.

(10) Patent No.: US 10,822,672 B2
(45) Date of Patent: *Nov. 3, 2020

(54) STEEL SHEET, HOT-DIP GALVANIZED STEEL SHEET, GALVANIZED STEEL SHEET, AND MANUFACTURING METHODS THEREFOR

(71) Applicant: NIPPON STEEL & SUMITOMO METAL CORPORATION, Tokyo (JP)

(72) Inventors: Yuri Toda, Kimitsu (JP); Masafumi Azuma, Tokai (JP); Akihiro Uenishi, Kisarazu (JP); Hiroyuki Kawata, Kisarazu (JP); Naoki Maruyama, Kimitsu (JP); Genichi Shigesato, Chiba (JP)

(73) Assignee: NIPPON STEEL CORPORATION, Tokyo (JP)

(*) Notice: Subject to any disclaimer, the term of this patent is extended or adjusted under 35 U.S.C. 154(b) by 197 days.

This patent is subject to a terminal disclaimer.

(21) Appl. No.: 15/743,398

(22) PCT Filed: Jul. 13, 2015

(86) PCT No.: PCT/JP2015/070069
§ 371 (c)(1),
(2) Date: Jan. 10, 2018

(87) PCT Pub. No.: WO2017/009938
PCT Pub. Date: Jan. 19, 2017

(65) Prior Publication Data
US 2018/0209006 A1    Jul. 26, 2018

(51) Int. Cl.
*B32B 15/00* (2006.01)
*C21D 9/46* (2006.01)
(Continued)

(52) U.S. Cl.
CPC .............. *C21D 9/46* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

2006/0140814 A1    6/2006  Antonissen et al.
2010/0183472 A1    7/2010  Nakaya et al.
(Continued)

FOREIGN PATENT DOCUMENTS

CN    1729307 A      2/2006
CN    101649415 A    2/2010
(Continued)

OTHER PUBLICATIONS

Chinese Office Action and Search Report, dated Dec. 3, 2018, for Chinese Application No. 201580081574.9, as well as an English translation of the Chinese Search Report.
(Continued)

*Primary Examiner* — Seth Dumbris
(74) *Attorney, Agent, or Firm* — Birch, Stewart, Kolasch & Birch, LLP

(57) ABSTRACT

A steel sheet according to an aspect of the present invention has predetermined chemical composition, in which a structure at a thickness ¼ portion includes, in terms of volume ratios, tempered martensite: 30% to 70% and one or both of ferrite and bainite: a total of 20% to 70%, in the structure at the thickness ¼ portion, a volume ratio of residual austenite is less than 10%, a volume ratio of fresh martensite is 10% or less, a volume ratio of pearlite is 10% or less, and a total volume ratio of the residual austenite, the fresh martensite,
(Continued)

and the pearlite is 15% or less, a number density of iron-based carbides having a major axis of 5 nm or more in the tempered martensite at the thickness ¼ portion is $5 \times 10^7$ particles/mm$^2$ or more, a ratio of the number of ε-type carbides in the number of the iron-based carbides having the major axis of 5 nm or more at the thickness ¼ portion is 20% or more, and a tensile strength is 780 MPa or higher.

8 Claims, 1 Drawing Sheet

(51) Int. Cl.

| | |
|---|---|
| C23C 2/06 | (2006.01) |
| C23C 2/28 | (2006.01) |
| C22C 38/04 | (2006.01) |
| C22C 38/58 | (2006.01) |
| B32B 15/01 | (2006.01) |
| C21D 6/00 | (2006.01) |
| C21D 8/02 | (2006.01) |
| C22C 38/00 | (2006.01) |
| C22C 38/02 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/38 | (2006.01) |

(52) U.S. Cl.
CPC ............ *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C22C 38/58* (2013.01); *C23C 2/06* (2013.01); *C23C 2/28* (2013.01); *C21D 8/02* (2013.01); *C21D 2211/002* (2013.01); *C21D 2211/005* (2013.01); *C21D 2211/008* (2013.01)

(56) References Cited

U.S. PATENT DOCUMENTS

| | | | |
|---|---|---|---|
| 2011/0005643 A1 | 1/2011 | Murakami et al. | |
| 2011/0048589 A1 | 3/2011 | Matsuda et al. | |
| 2012/0009434 A1 | 1/2012 | Hata et al. | |
| 2012/0018058 A1 | 1/2012 | Antonissen et al. | |
| 2012/0031528 A1 | 2/2012 | Hayashi et al. | |
| 2012/0222781 A1 | 9/2012 | Azuma et al. | |
| 2012/0305144 A1 | 12/2012 | Okamoto et al. | |
| 2013/0167980 A1 | 7/2013 | Kawata et al. | |
| 2013/0206288 A1 | 8/2013 | Kaneko et al. | |
| 2013/0292010 A1 | 11/2013 | Kimura et al. | |
| 2014/0234657 A1 | 8/2014 | Azuma et al. | |
| 2014/0234659 A1 | 8/2014 | Kawata et al. | |
| 2014/0242414 A1 | 8/2014 | Minami et al. | |
| 2014/0242416 A1* | 8/2014 | Matsuda ............... | C21D 8/02 428/659 |
| 2015/0083278 A1 | 3/2015 | Kawata et al. | |
| 2015/0299834 A1 | 10/2015 | Mizuta et al. | |

FOREIGN PATENT DOCUMENTS

| | | |
|---|---|---|
| CN | 101802238 A | 8/2010 |
| CN | 101928875 A | 12/2010 |
| CN | 102341521 A | 2/2012 |
| CN | 102770571 A | 11/2012 |
| CN | 103097566 A | 5/2013 |
| CN | 103290307 A | 9/2013 |
| CN | 104838027 A | 8/2015 |
| EP | 2881481 A1 | 6/2015 |
| JP | 1-230715 A | 9/1989 |
| JP | 2-217425 A | 8/1990 |
| JP | 7-197183 A | 8/1995 |
| JP | 8-134549 A | 5/1996 |
| JP | 11-100638 A | 4/1999 |
| JP | 11-279691 A | 10/1999 |
| JP | 11-293383 A | 10/1999 |
| JP | 2010-90432 A | 4/2010 |
| KR | 10-2011-0127283 A | 11/2011 |
| TW | 201319268 A1 | 5/2013 |
| WO | WO 2009/096595 A1 | 8/2009 |
| WO | WO 2009/110607 A1 | 9/2009 |
| WO | WO 2010/109702 A1 | 9/2010 |
| WO | WO 2014/092025 A1 | 6/2014 |

OTHER PUBLICATIONS

Extended European Search Report, dated Nov. 13, 2018, for European Application No. 15898251.2.
"Advances in Delayed Fracture Solution", The Iron and Steel Institute of Japan, Jan. 1997, total 25 pagesi.
International Search Report for PCT/JP2015/070069 dated Oct. 13, 2015.
Kinzoku Zairyo Gijutsu Kenkyusho, Zukai Kinzoku Zairyo Gijutsu Yogo Jiten —2nd edition—, 2nd edition, 1st print, The Nikkan Kogyo Shinbun, Ltd., Jan. 30, 2000, p. 454, total 2 pages.
Office Action for TW 104122584 dated Feb. 22, 2016.
Written Opinion of the International Searching Authority for PCT/JP2015/070069 (PCT/ISA/237) dated Oct. 13, 2015.
Yamazaki et al., "Effect of Microstructure on Formability and Delayed Cracking of Super High Strength Cold Rolled Steel Sheet", CAMP-ISIJ, The Iron and Steel Institute of Japan, Oct. 1992, vol. 5, No. 6, pp. 1839-1842, total 8 pages.
Duchoslav et al., "Evolution of the Surface Chemistry of Hot Dip Galvanized Zn—Mg—Al and Zn Coatings on Steel During Short Term Exposure to Sodium Chloride Containing Environments", Corrosion Science, vol. 91, 2015 (Available online Nov. 26, 2014), pp. 311-320.
Song et al., "Evaluation of the Corrosion Resistance of Different Galvanized Steels Treated in a Cerium Salt Solution", Materials and Corrosion, vol. 56, No. 4, 2005, pp. 229-236.
Extended European Search Report dated Nov. 7, 2018, in European Patent Application No. 15898249.6.
International Search Report for PCT/JP2015/070050 dated Oct. 13, 2015.
Korean Notice of Allowance, dated Sep. 23, 2019, for Korean Application No. 10-2018-7000390, with an English translation.
Office Action for TW 104122580 dated Mar. 1, 2016.
Office Action dated Dec. 3, 2018, in Chinese Patent Application No. 201580081597.X, with English translation.
U.S. Office Action, dated Oct. 24, 2019, for U.S. Appl. No. 15/743,432.
U.S. Office Action, dated Feb. 10, 2020, for U.S. Appl. No. 15/743,432.
Written Opinion of the International Searching Authority for PCT/JP2015/070050 (PCT/ISA/237) dated Oct. 13, 2015.

\* cited by examiner

STEEL SHEET, HOT-DIP GALVANIZED STEEL SHEET, GALVANIZED STEEL SHEET, AND MANUFACTURING METHODS THEREFOR

TECHNICAL FIELD OF THE INVENTION

The present invention relates to a steel sheet, a hot-dip galvanized steel sheet, and a galvannealed steel sheet which are preferable as structural members for vehicles, buildings, home electric appliances, and the like and has a tensile strength of 780 MPa or higher and an excellent delayed fracture resistance properties, and manufacturing methods therefor.

RELATED ART

Recently, for steel sheets that are used as structural members for vehicles, buildings, home electric appliances, and the like, there is a demand for an excellent delayed fracture resistance properties as well as necessary strength and formability. Delayed fracture is a phenomenon in which hydrogen that has intruded into steel gathers at stress concentration portions and fractures the steel.

It has been known in the related art that delayed fracture occurs in high-strength steel such as high-strength bolts, uncoated stress-relieved steel wires for prestressed concrete, and line pipes. For the high-strength steel, a variety of measures for improving delayed fracture resistance properties have been proposed.

For example, Non-Patent Document 1 discloses that elements such as Cr, Mo, and V are effective for the improvement of delayed fracture resistance properties. This is a technique in which carbides of Cr, Mo, V, and the like are precipitated in crystal grains, and these carbides are used as sites for trapping hydrogen (hydrogen trap sites), thereby suppressing the embrittlement of grain boundaries.

High-strength materials do not easily plastically deform and, furthermore, do not easily break and are thus frequently used in environments under high stress. In addition, in steel that are used as members after being formed like steel sheets for vehicles, residual stress is generated after forming processes. Since the degree of the residual stress increases as the strength of steel sheets increases, in high-strength steel sheets, the concern of delayed fracture intensifies.

Therefore, in order to apply high-strength steel sheets to vehicle components, it is essential to enhance the formability of the steel sheets to obtain components by forming the steel sheets and, furthermore, enhance the delayed fracture resistance properties of the steel sheets to enable the steel sheets to withstand use in high stress environments.

In addition, the above-described function of the carbides of elements such as Cr, Mo, and V as hydrogen trap sites is derived from the coherence (coherency strain) in the interfaces between primary phases and the carbides, and the function degrades after cold-rolling and heat treatments. Therefore, the use of the carbides of elements such as Cr, Mo, and V as hydrogen trap sites is not applicable to steel sheets for which cold-rolling and heat treatments are required.

Patent Document 1 discloses that oxides mainly made up of Ti and Mg are effective for the suppression of hydrogen defect (the improvement of delayed fracture resistance properties). The hydrogen embrittlement measure disclosed in Patent Document 1 is intended to improve, particularly, hydrogen embrittlement after large heat input welding, and Patent Document 1 describes thick steel sheets as the subject, but does not care about the satisfaction of both high formability and high delayed fracture resistance properties which are required for thin steel sheets.

Regarding the hydrogen embrittlement of thin steel sheets, for example, Non-Patent Document 2 discloses that the hydrogen embrittlement of thin steel sheets is promoted by the strain induced transformation of the residual austenite content. That is, it is disclosed that, in order to prevent the delayed fracture resistance properties from being deteriorated in thin steel sheets, it is necessary to control the residual austenite content.

However, the measure for improving delayed fracture resistance properties disclosed in Non-Patent Document 2 relates to high-strength thin steel sheets having a specific structure and cannot be said as a fundamental measure for improving delayed fracture resistance properties.

As thin steel sheets intended to improve delayed fracture resistance properties and formability, Patent Document 2 discloses a steel sheet for an enamel container having excellent fish-scale resistance. In this steel sheet, hydrogen that has intruded into the steel sheet during production is trapped using oxides in the steel sheet, thereby suppressing "fish scale" (surface defect) caused after the application of enamel.

Therefore, the steel sheet disclosed in Patent Document 2 includes a large content of oxides therein. However, the dispersion of oxides in steel sheets at a high density deteriorates formability. Therefore, the technique disclosed in Patent Document 2 is not applicable to steel sheets for vehicles that require high formability.

Meanwhile, as a method for improving the formability of steel sheets, a method in which transformation-induced plasticity (TRIP effect) that transforms residual austenite that has been dispersed in a steel sheet to martensite during the processing (molding) of the steel sheet is used (refer to Patent Documents 3 and 4). However, martensite generated after forming promotes the initiation of delayed fracture, and thus, in steel sheets requiring the improvement of formability and delayed fracture resistance properties, it is difficult to use the TRIP effect (refer to Non-Patent Document 2). As described above, in steel sheets, it is difficult to enhance both formability and delayed fracture resistance properties.

PRIOR ART DOCUMENT

Patent Document

[Patent Document 1] Japanese Unexamined Patent Application, First Publication No. H11-293383

[Patent Document 2] Japanese Unexamined Patent Application, First Publication No. H11-100638

[Patent Document 3] Japanese Unexamined Patent Application, First Publication No. H01-230715

[Patent Document 4] Japanese Unexamined Patent Application, First Publication No. H02-217425

Non-Patent Document

[Non-Patent Document 1] "New Evolution of Delayed Fracture Clarification" (The Iron and Steel Institute of Japan, published January, 1997)

[Non-Patent Document 2] CAMP-ISIJ Vol. 5 No. 6 pp. 1839 to 1842, Yamazaki et al., October 1992, The Iron and Steel Institute of Japan

DISCLOSURE OF THE INVENTION

Problems to be Solved by the Invention

As described above, in steel sheets, it is difficult to enhance both formability and delayed fracture resistance properties. The present invention intends to improve delayed fracture resistance properties while ensuring formability in steel sheets, hot-dip galvanized steel sheets, and galvannealed steel sheets having a tensile strength of 780 MPa or higher. An object of the present invention is to provide a steel sheet, a hot-dip galvanized steel sheet, and a galvannealed steel sheet which achieve the above-described intention, and manufacturing methods therefor.

Means for Solving the Problem

The present inventors intensively studied methods for achieving the above-described object. As a result, the present inventors found that, in a steel sheet having a C content in a range of 0.05% to 0.40% and a tensile strength of 780 MPa or higher, when a structure including tempered martensite which is a primary phase in a necessary volume ratio and one or both of ferrite and bainite which are secondary phases in a necessary volume ratio, and including other phases in a limited volume ratio is formed, an iron-based carbide is precipitated in the tempered martensite at a necessary number density or more, and an ε-type carbide is provided as 20% or more of the iron-based carbide, it is possible to improve the delayed fracture resistance properties while ensuring the formability of the steel sheet.

The present invention has been made on the basis of the above-described finding, and the gist is as described below.

(1) A steel sheet according to an aspect of the present invention includes, as chemical composition, by mass %: C: 0.05% to 0.40%, Si: 0.05% to 3.00%, Mn: 1.50% or more and less than 3.50%, P: 0.04% or less, S: 0.01% or less, N: 0.01% or less, O: 0.006% or less, Al: 0% to 2.00%, Cr: 0% to 1.00%, Mo: 0% to 1.00%, Ni: 0% to 1.00%, Cu: 0% to 1.00% Nb: 0% to 0.30%, Ti: 0% to 0.30%, V: 0% to 0.50% B: 0% to 0.01% Ca: 0% to 0.04%, Mg: 0% to 0.04%, REM: 0% to 0.04%, and a remainder of Fe and impurities, in which a structure at a thickness ¼ portion includes, in terms of volume ratios, tempered martensite: 30% to 70% and one or both of ferrite and bainite: a total of 20% to 70%, in which in the structure at the thickness ¼ portion, a volume ratio of residual austenite is less than 10%, a volume ratio of fresh martensite is 10% or less, a volume ratio of pearlite is 10% or less, and a total volume ratio of the residual austenite, the fresh martensite, and the pearlite is 15% or less, in which the number density of iron-based carbides having a major axis of 5 nm or more in the tempered martensite at the thickness ¼ portion is $5 \times 10^7$ particles/mm$^2$ or more, in which the ratio of the number of ε-type carbides with respect to the number of the iron-based carbides having the major axis of 5 nm or more at the thickness ¼ portion is 20% or more, and in which the tensile strength is 780 MPa or higher.

(2) In the steel sheet according to (1), the chemical composition may include, by mass %, one or more selected from the group consisting of Cr: 0.05% to 1.00%, Mo: 0.01% to 1.00%, Ni: 0.05% to 1.00%, and Cu: 0.05% to 1.00%.

(3) In the steel sheet according to (1) or (2), the chemical composition may include, by mass %, one or more selected from the group consisting of Nb: 0.005% to 0.30%, Ti: 0.005% to 0.30%, and V: 0.005% to 0.50%.

(4) In the steel sheet according to any one of (1) to (3), the chemical composition may include, by mass %, B: 0.0001% to 0.01%.

(5) In the steel sheet according to any one of (1) to (4), the chemical composition may include, by mass %, one or more selected from the group consisting of Ca: 0.0005% to 0.04%, Mg: 0.0005% to 0.04%, and REM: 0.0005% to 0.04%.

(6) In the steel sheet according to any one of (1) to (5), an average major axis of the iron-based carbides may be 350 nm or less.

(7) In a hot-dip galvanized steel sheet according to another aspect of the present invention, a hot-dip galvanized layer including 15 mass % or less of Fe and a remainder of Zn, Al, and impurities is formed on a surface of the steel sheet according to any one of (1) to (6).

(8) In a galvannealed steel sheet according to still another aspect of the present invention, a galvannealed layer including 15 mass % or less of Fe and a remainder of Zn, Al, and impurities is formed on a surface of the steel sheet according to any one of (1) to (6).

Effects of the Invention

According to the present invention, it is possible to provide a steel sheet, a hot-dip galvanized steel sheet, and a galvannealed steel sheet which are preferable as structural members for vehicles, buildings, home electric appliances, and the like and has a tensile strength of 780 MPa or higher and an excellent delayed fracture resistance properties, and manufacturing methods therefor.

EMBODIMENTS OF THE INVENTION

Figure 1:
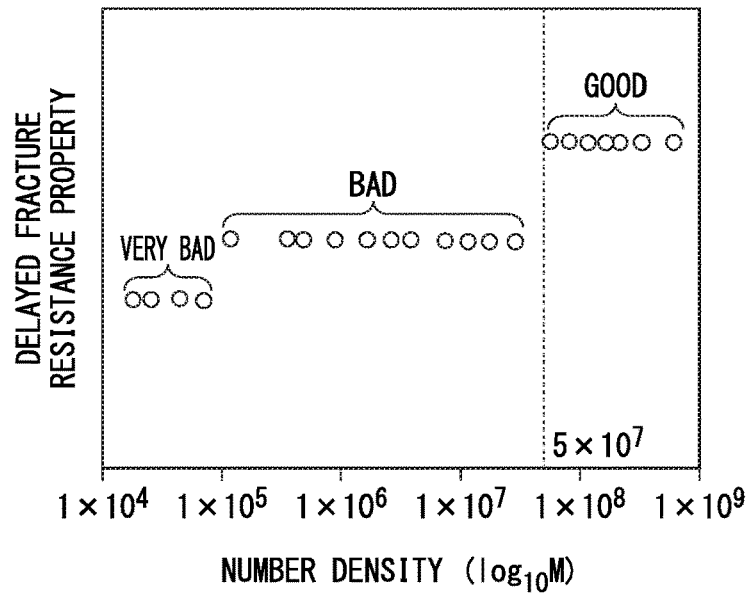
FIG. 1 is a visual field showing a relationship between the number density (particles/mm$^2$) of iron-based carbides in tempered martensite and delayed fracture resistance properties.

It is known that carbides of Cr, Mo, V, and the like function as hydrogen trap sites and improve delayed fracture resistance properties relating to hydrogen embrittlement (refer to Non-Patent Document 1). However, heat treatments for precipitating the carbides of Cr, Mo, V, and the like take long period of times, and thus it is difficult to use the precipitation of the carbides of Cr, Mo, V, and the like for improving delayed fracture resistance properties in steel sheets that need to produced using production lines in which heat treatments need to be carried out in a short period of time (continuous annealing lines, continuous plating lines, and the like).

The hydrogen-trapping function is derived from the coherence (coherency strain) in the interfaces between base metals and the carbides, but the hydrogen-trapping capability of the carbides of Cr, Mo, V, and the like precipitated during hot-rolling degrades after cold-rolling and heat treatments, and thus it is difficult to use the precipitation of the carbides of Cr, Mo, V, and the like for improving delayed fracture resistance properties in steel sheets for which cold-rolling and heat treatments are required.

As described above, it is very difficult to improve both of delayed fracture resistance properties and formability. However, the present inventors found that, in steel sheets having a tensile strength of 780 MPa or higher, when structures and iron-based carbides (particularly, ε-type carbides) are preferably controlled, delayed fracture resistance properties can be improved while maintaining formability.

Hereinafter, a steel sheet having excellent delayed fracture resistance properties according to an embodiment of the present invention (hereinafter, in some cases, referred to as "the steel sheet according to the present embodiment") will be described.

The steel sheet according to the present embodiment has a basic idea in which, in steel sheets, hot-dip galvanized steel sheets, and galvannealed steel sheets having a tensile strength of 780 MPa or higher and excellent delayed fracture resistance properties, tempered martensite is set as a primary phase of the structure, one or both of ferrite and bainite is set as a secondary phase, and a fine iron-based carbide (cementite and an ε-type carbide) is precipitated in tempered martensite, and delayed fracture resistance properties are improved while maintaining formability by using this iron-based carbide as a hydrogen trap site.

Specifically, in the steel sheet according to an embodiment of the present invention which has excellent delayed fracture resistance properties (hereinafter, in some cases, referred to as "the steel sheet according to the present embodiment"), the chemical composition includes, by mass %, C: 0.05% to 0.40%, Si: 0.05% to 3.00%, Mn: 1.50% or more and less than 3.50%, P: 0.04% or less, S: 0.01% or less, N: 0.01% or less, O: 0.006% or less, Al: 0% to 2.00%, Cr: 0% to 1.00%, Mo: 0% to 1.00%, Ni: 0% to 1.00%, Cu: 0% to 1.00% Nb: 0% to 0.30%, Ti: 0% to 0.30%, V: 0% to 0.50% B: 0% to 0.01% Ca: 0% to 0.04%, Mg: 0% to 0.04%, and REM: 0% to 0.04% with a remainder of Fe and impurities, in which a structure at a thickness ¼ portion includes, in terms of volume ratios, tempered martensite: 30% to 70% and one or both of ferrite and bainite: a total of 20% to 70%, in which in the structure at the thickness ¼ portion, a volume ratio of residual austenite is less than 10%, a volume ratio of fresh martensite is 10% or less, a volume ratio of pearlite is 10% or less, and a total volume ratio of the residual austenite, the fresh martensite, and the pearlite is 15% or less, in which the number density of iron-based carbides having a major axis of 5 nm or more in the tempered martensite at the thickness ¼ portion is $5 \times 10^7$ particles/mm$^2$ or more, in which the ratio of the number of ε-type carbides with respect to the number of the iron-based carbides having the major axis of 5 nm or more at the thickness ¼ portion is 20% or more, and in which a tensile strength is 780 MPa or higher.

In a hot-dip galvanized steel sheet according to the present embodiment which has excellent delayed fracture resistance properties (hereinafter, in some cases, referred to as "the hot-dip galvanized steel sheet according to the present embodiment"), a hot-dip galvanized layer including 15 mass % or less of Fe and a remainder consisting of Zn, Al, and impurities is formed on a surface of the steel sheet according to the present embodiment.

In a galvannealed steel sheet according to the present embodiment which has excellent delayed fracture resistance properties (hereinafter, in some cases, referred to as "the galvannealed steel sheet according to the present embodiment"), a galvannealed layer including 15 mass % or less of Fe and a remainder consisting of Zn, Al, and impurities is formed on a surface of the steel sheet according to the present embodiment.

First, the chemical composition of the steel sheet according to the present embodiment will be described. Hereinafter, "mass %" which is the unit of the amount of each element included in the chemical composition will be abbreviated as "%".

C: 0.05% to 0.40%

The steel sheet according to the present embodiment is a steel sheet which includes 0.05% to 0.40% of C and has a tensile strength of 780 MPa or higher. C is an element necessary for an increase in the strength of the steel sheet and the precipitation of an iron-based carbide (cementite, an ε-type carbide, and the like) that functions as a hydrogen trap site. When the C content is less than 0.05%, it is difficult to obtain a tensile strength of 780 MPa or higher. In addition, when the C content is less than 0.05%, the amount of the iron-based carbide being precipitated becomes insufficient, and the delayed fracture resistance properties do not improve.

On the other hand, when the C content exceeds 0.40%, the martensitic transformation start temperature lowers, a sufficient content of martensite cannot be ensured, and thus it becomes difficult to ensure 30 to 70 vol % of tempered martensite.

Therefore, the C content in the steel sheet according to the present embodiment is set to 0.05% to 0.40%. A preferred lower limit value of the C content is 0.10%. A preferred upper limit value of the C content is 0.25%.

Si: 0.05% to 3.00%

Si is an element effective for improving the strength. Furthermore, Si is an element having an action of suppressing the precipitation of the iron-based carbide in austenite and an action of suppressing the coarsening of the iron-based carbide generated in martensite. As the iron-based carbide in martensite becomes finer, the delayed fracture resistance properties further improves, and thus Si has an effect of improving the delayed fracture resistance properties.

At a Si content of less than 0.05%, the above-described effect cannot be sufficiently obtained, and thus the Si content needs to be 0.05% or more. The Si content is preferably 0.10% or more. On the other hand, when the Si content exceeds 3.00%, the strength of the steel sheet excessively increases, and the formability of the steel sheet degrades, and thus the Si content needs to be set to 3.00% or less. The Si content is preferably 2.00% or less.

Mn: 1.50% or More and Less than 3.50%

Mn is an element effective for improving the strength of the steel sheet. In addition, Mn is an element having an action of suppressing ferritic transformation occurring during cooling in heat treatments for annealing or hot-dip galvanizing. This action is required to set the amount of tempered martensite in the steel sheet according to the present embodiment to be in a predetermined range.

At a Mn content of less than 1.50%, the above-described effect cannot be sufficiently obtained, and thus it becomes impossible to obtain a necessary volume ratio of tempered martensite. Therefore, the Mn content needs to be set to 1.50% or more. The Mn content is preferably 1.70% or more. On the other hand, when the Mn content reaches 3.50% or more, the strength of slabs or hot-rolled sheets excessively increases, and the manufacturability of the steel sheet degrades, and thus the Mn content needs to be set to less than 3.50%. The Mn content is preferably 3.00% or less.

P: 0.04% or Less

P is an impurity element and is an element which is segregated in the sheet thickness center portion of the steel sheet, thus, impairs the toughness, and which embrittles welded portions. When the P content exceeds 0.04%, the toughness significantly degrades, and welded portions significantly embrittle, and thus the P content needs to be set to 0.04% or less. The P content is preferably 0.02% or less. The P content is preferably smaller, and thus the lower limit of the P content is not particularly limited, but the P content being set to less than 0.0001% is economically disadvantageous, and thus the substantial lower limit of the P content is 0.0001%.

S: 0.01% or Less

S is an impurity element and is an element which impairs the weldability and impairs the manufacturability during casting and during hot-rolling. In addition, S is an element that forms coarse MnS and thus impairs the hole expansibility. When the S content exceeds 0.01%, the weldability significantly degrades, the manufacturability significantly degrades, and the hole expansibility significantly degrades, and thus the S content needs to be set to 0.01% or less. The S content is preferably 0.005% or less. The S content is preferably smaller, and thus the lower limit of the S content is not particularly limited, but the S content being set to less than 0.0001% is economically disadvantageous, and thus the substantial lower limit of the S content is 0.0001%.

N: 0.01% or Less

N is an element that forms coarse nitrides and thus impairs the bendability and the hole expansibility and is an element that causes the generation of blowholes during welding. When the N content exceeds 0.01%, the bendability and the hole expansibility significantly degrade, and a significant number of blowholes are generated, and thus the N content needs to be set to 0.01% or less. The N content is preferably smaller, and thus the lower limit of the N content is not particularly limited, but the N content being set to less than 0.0005% causes a significant increase in manufacturing costs, and thus the substantial lower limit of the N content is 0.0005%.

O: 0.006% or Less

O is an element which forms oxides and impairs the formability. When the O content exceeds 0.006%, the formability significantly degrades, and thus the O content needs to be set to 0.006% or less. The O content is preferably smaller, and thus the lower limit is not particularly limited, but the O content being set to less than 0.001% causes an excess increase in costs and is not economically preferable, and thus the substantial lower limit of the O content is 0.001%.

The steel sheet according to the present embodiment may appropriately include, in addition to the above-described elements, one or more selected from the group consisting of Al, Cr, Mo, Ni, and Cu, one or more selected from the group consisting of Nb, Ti, and V, B, and/or one or more selected from the group consisting of Ca, Mg, and REM. Here, the steel sheet according to the present embodiment does not essentially include these elements, and thus the lower limit values of the amounts of the elements are zero percent.

Al: 0% to 2.00%

Al is an effective element as a deoxidation material and is an element having an action of, similar to Si, suppressing the precipitation of the iron-based carbide in austenite. Furthermore, Al oxides contribute to the improvement of the delayed fracture resistance properties, and thus Al may be included in the steel sheet according to the present embodiment. However, when the Al content exceeds 2.00%, Al oxides are excessively generated, and the manufacturability deteriorates, and thus the Al content needs to be set to 2.00% or less. The Al content is preferably 1.00% or less. Al does not need to be included in the steel sheet according to the present embodiment, and thus the lower limit of the Al content is zero percent. However, it is difficult to fully remove Al that is included as an impurity in the raw material of the steel sheet, and thus the lower limit value of the Al content may be set to 0.001%.

Cr: 0% to 1.00%

Cr is an element that improves the tensile strength and the like of the steel sheet and is an element having an action of suppressing ferritic transformation during cooling after annealing in annealing facilities or hot-dip galvanizing facilities and thus increasing the content of tempered martensite. Cr does not need to be included in the steel sheet according to the present embodiment, and thus the lower limit of the Cr content is zero percent. However, in order to obtain the above-described effect, the Cr content may be set to 0.05% or more. The Cr content is more preferably 0.10% or more. On the other hand, when the Cr content exceeds 1.00%, the manufacturability is impaired during production and during hot-rolling, and thus the Cr content is preferably 1.00% or less. The Cr content is more preferably 0.70% or less.

Mo: 0% to 1.00%

Mo is an element that improves the tensile strength and the like of the steel sheet and is an element having an action of suppressing ferritic transformation during cooling after annealing in annealing facilities or hot-dip galvanizing facilities and thus increasing the content of tempered martensite. Mo does not need to be included in the steel sheet according to the present embodiment, and thus the lower limit of the Mo content is zero percent. However, in order to obtain the above-described effect, the Mo content may be set to 0.01% or more. The Mo content is more preferably 0.05% or more. On the other hand, when the Mo content exceeds 1.00%, the manufacturability is impaired during production and during hot-rolling, and thus the Mo content is preferably 1.00% or less. The Mo content is more preferably 0.70% or less.

Ni: 0% to 1.00%

Ni is an element that improves the tensile strength and the like of the steel sheet and is an element having an action of suppressing ferritic transformation during cooling after annealing in annealing facilities or hot-dip galvanizing facilities and thus increasing the content of tempered martensite. Ni does not need to be included in the steel sheet according to the present embodiment, and thus the lower limit of the Ni content is zero percent. However, in order to obtain the above-described effect, the Ni content may be set to 0.05% or more. The Ni content is more preferably 0.10% or more. On the other hand, when the Ni content exceeds 1.00%, the manufacturability is impaired during production and during hot-rolling, and thus the Ni content is preferably 1.00% or less. The Ni content is more preferably 0.70% or less.

Cu: 0% to 1.00%

Cu is an element that improves the tensile strength and the like of the steel sheet and is an element having an action of suppressing ferritic transformation during cooling after annealing in annealing facilities or hot-dip galvanizing facilities and thus increasing the content of tempered martensite. Cu does not need to be included in the steel sheet according to the present embodiment, and thus the lower limit of the Cu content is zero percent. However, in order to obtain the above-described effect, the Cu content may be set to 0.05% or more. The Cu content is more preferably 0.10% or more. On the other hand, when the Cu content exceeds 1.00%, the manufacturability is impaired during production and during hot-rolling, and thus the Cu content is preferably 1.00% or less. The Cu content is more preferably 0.70% or less.

Nb: 0% to 0.30%

Nb is an element that contributes to an increase in the strength of the steel sheet by precipitation strengthening, fine grain strengthening, and dislocation strengthening. Nb does not need to be included in the steel sheet according to the present embodiment, and thus the lower limit of the Nb content is zero percent. However, in order to obtain the above-described effect, the Nb content may be set to 0.005% or more. The Nb content is more preferably 0.010% or more. On the other hand, when the Nb content exceeds 0.30%, the content of carbonitrides being precipitated increases, and the formability deteriorates, and thus the Nb content is preferably 0.30% or less. The Nb content is more preferably 0.20% or less.

Ti: 0% to 0.30%

Ti is an element that contributes to an increase in the strength of the steel sheet by precipitation strengthening, fine grain strengthening, and dislocation strengthening. Ti does not need to be included in the steel sheet according to the present embodiment, and thus the lower limit of the Ti content is zero percent. However, in order to obtain the above-described effect, the Ti content may be set to 0.005% or more. The Ti content is more preferably 0.010% or more. On the other hand, when the Ti content exceeds 0.30%, the content of carbonitrides being precipitated increases, and the formability deteriorates, and thus the Ti content is preferably 0.30% or less. The Ti content is more preferably 0.15% or less.

V: 0% to 0.50%

V is an element that contributes to an increase in the strength of the steel sheet by precipitation strengthening, fine grain strengthening, and dislocation strengthening. V does not need to be included in the steel sheet according to the present embodiment, and thus the lower limit of the V content is zero percent. However, in order to obtain the above-described effect, the V content may be set to 0.005% or more. The V content is more preferably 0.10% or more. On the other hand, when the V content exceeds 0.50%, the content of carbonitrides being precipitated increases, and the formability deteriorates, and thus the V content is preferably 0.50% or less. The V content is more preferably 0.35% or less.

B: 0% to 0.01%

B is an element that strengthens grain boundaries and is an element having an action of suppressing ferritic transformation during cooling after annealing in annealing facilities or hot-dip galvanizing facilities and thus increasing the content of tempered martensite. B does not need to be included in the steel sheet according to the present embodiment, and thus the lower limit of the B content is zero percent. However, in order to obtain the above-described effect, the B content may be set to 0.0001% or more. The B content is more preferably 0.0005% or more. On the other hand, when the B content exceeds 0.01%, the manufacturability during hot-rolling degrades, and thus the B content is preferably 0.01% or less. The B content is more preferably 0.005% or less.

Ca: 0% to 0.04%

Mg: 0% to 0.04%

REM: 0% to 0.04%

Ca, Mg, and REM are elements which control the forms of oxides and sulfides and contribute to the improvement of the hole expansibility of the steel sheet. Ca, Mg, and REM do not need to be included in the steel sheet according to the present embodiment, and thus the lower limits of the Ca content, the Mg content, and the REM content are zero percent. However, in order to obtain the above-described effect, the Ca content, the Mg content, and the REM content may be respectively set to 0.0005% or more. The Ca content, the Mg content, and the REM content are more preferably 0.0010% or more, respectively. On the other hand, when the Ca content, the Mg content, and the REM content respectively exceed 0.04%, the castability deteriorates, and thus the Ca content, the Mg content, and the REM content are respectively preferably 0.04% or less. The Ca content, the Mg content, and the REM content are respectively more preferably 0.01% or less.

Meanwhile, "REM" refers to a total of 17 elements consisting of Sc, Y, and lanthanoide, and the "REM content" means the total content of these 17 elements. In a case in which lanthanoide is used as REM, industrially, REM is frequently added in a Mischmetal form. Even in this case, the steel sheet according to the present embodiment exhibits the effects of the steel sheet according to the present embodiment. In addition, even when metal REM such as metal La or metal Ce is added thereto, the steel sheet according to the present embodiment exhibits the effects of the steel sheet according to the present embodiment.

The steel sheet according to the present embodiment is made up of a remainder of iron and inevitable impurities as well as the above-described elements. The impurities refer to components which mix into steel sheets during the industrial production of the steel sheets due to raw materials such as minerals or scraps or a variety of causes in production processes and are allowed to be included as long as the present invention is not adversely affected.

Tensile Strength: 780 MPa or Higher

The tensile strength of the steel sheet according to the present embodiment is set to 780 MPa or higher. This tensile strength can be obtained by controlling the chemical composition of the steel sheet in the above-described ranges and forming a form as described below as the structure of the steel sheet.

Next, the structure at the thickness ¼ portion (hereinafter, in some cases, abbreviated as "structure") of the steel sheet according to the present embodiment will be described. The thickness ¼ portion refers to a region between the surface at a depth of ⅛ of the steel sheet thickness t from the steel sheet surface (the upper surface and the lower surface of the steel sheet) and the surface at a depth of ⅜ of the steel sheet thickness t from the steel sheet surface. The surface at a depth of ¼ of the steel sheet thickness t from the steel sheet surface is the central surface of the thickness ¼ portion. The thickness ¼ portion is located in the middle between the central surface of the steel sheet and the surface of the sheet and thus has an average structure. Therefore, in the steel sheet according to the present embodiment, the structure at the thickness ¼ portion is regulated.

The structure at the thickness ¼ portion in the steel sheet according to the present embodiment is regulated in terms of volume ratio as (structure A) tempered martensite: 30% to 70%, (structure B) one or both of ferrite and bainite: a total of 20% or more, and (structure C) residual austenite, fresh martensite, and pearlite: less than 10% respectively.

The structure A is a structure that has an ε-type carbide and thus has the biggest influence on the tensile strength and delayed fracture resistance properties of the steel sheet according to the present embodiment, that is, a primary phase. The structure B is a structure which does not include the ε-type carbide, and a secondary phase for optimizing the properties of the steel sheet according to the present embodiment. The structure C does not have any action of improving a variety of characteristics of the steel sheet according to the present embodiment and is thus a structure that does not need to be included, and thus the lower limit value of the amount thereof is 0 vol %.

(Structure A) Tempered Martensite (Primary Phase) at the Thickness ¼ Portion: 30% to 70%

In the structure, tempered martensite is an important structure for ensuring the strength and delayed fracture resistance properties of the steel sheet.

Tempered martensite is an aggregate of lath-shaped crystal grains and includes the iron-based carbide therein. The iron-based carbide belongs to a group of a plurality of iron-based carbides that extends in different directions and functions as hydrogen trap sites. The major axis of the iron-based carbide is, for example, 5 nm or more. Some of the iron-based carbide in the tempered martensite can be turned into an ε-type carbide described below by heat treatments carried out under appropriate conditions.

When quenched martensite is tempered, tempered martensite is obtained. When the volume ratio of tempered martensite is less than 30% or more, it is not possible to set the tensile strength of the steel sheet to 780 MPa or higher, and thus the volume ratio of tempered martensite is set to 30% or more. The volume ratio of tempered martensite is preferably 35% or more.

When the volume ratio of tempered martensite exceeds 70%, the tensile strength of the steel sheet excessively increases and the formability of the steel sheet degrades, and thus the volume ratio of tempered martensite is set to 70% or less. The volume ratio of tempered martensite is preferably 65% or less.

(Structure B) One or Both of Ferrite and Bainite (Secondary Phase): A Total of 20% or More In the steel sheet according to the present embodiment, structures other than the above-described tempered martensite are mainly the structure B that is mainly constituted of one or both of ferrite and bainite.

Although ferrite is a soft structure and causes a decrease in the strength of the steel sheet, the ferrite is a structure which improves the processing characteristics of the steel sheet. In order to secure the processing characteristics, the structure of the steel sheet may include 20% or more of ferrite. Ferrite does not include iron-based carbides, and thus, does not have influence on delayed fracture resistance properties.

Similar to martensite, bainite is also an aggregate of lath-shaped crystal grains and is a structure including, for example, an iron-based carbide having a major axis of 5 nm or more therein. The iron-based carbide functions as a hydrogen trap site and thus the delayed fracture resistance properties of the steel sheet improves. On the other hand, bainite is softer than martensite and does not excessively decrease formability of the steel sheet. Thus, the structure of the steel sheet may include 20% or more of bainite.

Meanwhile, bainite including the iron-based carbide is also a structure that contributes to the improvement of the delayed fracture resistance properties. However, unlike martensite capable of controlling the precipitation of carbides by heat treatments after the generation of martensite, bainite is a structure that is generated by being held at a necessary temperature for a long period of time, and thus it is not possible to maintain some of the iron-based carbide in an ε-type carbide form.

The present inventors determined that, in order to favorably control all of the delayed fracture resistance properties, the formability, and the tensile strength, it is necessary to classify structures included in the steel sheet according to the present embodiment into the essential structure A (that is, tempered martensite) including the ε-type carbide, the essential structure B (that is, ferrite and bainite) which does not include any ε-type carbide, and the structure C that does not need to be included in the steel sheet according to the present embodiment and regulate the amounts of the respective groups. Therefore, in the steel sheet according to the present embodiment, the total volume ratio of ferrite and bainite is regulated.

If the total volume ratio of one or both of ferrite and bainite (secondary phase) is lower than 20%, the content of tempered martensite or other structures which will be described later become excessive so that formability necessary for forming members for vehicles cannot be obtained. Therefore, the total volume ratio of one or both of ferrite and bainite (secondary phase) is 20% or more. The total volume ratio of one or both of ferrite and bainite (secondary phase) is preferably 25% or more. Since the lower limit of volume ratio of tempered martensite is 30%, the upper limit of total volume ratio of one or both of ferrite and bainite (secondary phase) is 70%. The volume ratio of ferrite alone and the volume ratio of bainite alone are not defined. If one of the volume ratios of ferrite and bainite is 0%, formability necessary for forming members for vehicles can be obtained as long as the other volume ratio of ferrite and bainite is 20% or more.

For example, if the volume ratio of tempered martensite is 30%, the total volume ratio of one or both of ferrite and bainite reaches to 70%. However, in that case, the tempered martensite, which includes a required amount of iron-based carbide of which the precipitation amount can be controlled by heat treatment, is assumed as a primary phase of the steel sheet according to the present embodiment.

(Structure C) Residual Austenite: Less than 10 Vol %
(Structure C) Fresh Martensite: Less than 10 Vol %
(Structure C) Pearlite: Less than 10 Vol %
(Structure C) the Total Amount of Residual Austenite, Fresh Martensite, and Pearlite: 15 Vol % or Less The steel sheet according to the present embodiment, in some cases, includes residual austenite, fresh martensite, and pearlite in addition to tempered martensite, ferrite, and bainite.

Residual austenite contributes to the improvement of the formability due to the TRIP effect. However, when the volume ratio of residual austenite increases, the residual austenite transforms to full hard fresh martensite during forming into members for vehicles, and there is a concern that the processing characteristics may degrade.

The present inventors confirmed from experiments that, when the volume ratio of residual austenite in the structure of the steel sheet reaches 10% or more, the processing characteristics deteriorate. Therefore, in the steel sheet according to the present embodiment, the volume ratio of residual austenite is set to less than 10%. The volume ratio of residual austenite is preferably 7% or less. Meanwhile, even when the volume ratio of residual austenite is 0%, the steel sheet according to the present embodiment has sufficient formability. Therefore, the steel sheet according to the present embodiment does not need to include residual austenite, and thus the lower limit value of the volume ratio of residual austenite is 0%.

Fresh martensite refers to martensite including no Fe carbides. Steel sheets including fresh martensite have high strength, but the processing characteristics deteriorate, and thus the volume ratio of fresh martensite in the steel sheet according to the present embodiment is limited to 10% or less. Meanwhile, even when the volume ratio of fresh martensite is 0%, the steel sheet according to the present embodiment has a sufficient strength. Therefore, the steel sheet according to the present embodiment does not need to include fresh martensite, and thus the lower limit value of the volume ratio of fresh martensite is 0%.

Pearlite degrades the processing characteristics of the steel sheet. Therefore, the volume ratio of pearlite in the steel sheet according to the present embodiment is limited to 10% or less. Meanwhile, pearlite is a structure including cementite that is a Fe carbide, but it is not possible to change this cementite to a ε-type carbide, pearlite does not have a sufficient effect of improving delayed fracture resistance properties. Therefore, the steel sheet according to the present embodiment does not need to include pearlite, and thus the lower limit value of the volume ratio of pearlite is 0%.

Furthermore, the total volume ratio of residual austenite, fresh martensite, and pearlite in the steel sheet according to the present embodiment needs to be set to 15% or less and is preferably set to 12% or less or 10% or less. The inclusion of residual austenite, fresh martensite, and pearlite in a total volume ratio of more than 15% has a concern of impairing the processing characteristics of the steel sheet.

The identification of tempered martensite, ferrite, bainite, and residual austenite, furthermore, fresh martensite, pearlite, and other structures, the confirmation of the presence locations thereof, and the measurement of the volume ratios thereof can be carried out by corroding a cross section in a rolling direction of the steel sheet or a cross section in a direction perpendicular to the rolling direction using a Nital reagent and the reagent disclosed in Japanese Unexamined Patent Application, First Publication No. S59-219473 and observing the cross sections using a scanning electron microscope and a transmission electron microscope (having a magnification capability of 1,000 to 100,000 times).

In addition, the structures can be determined by crystal orientation analyses with FE-SEM (crystal orientation analyses method using EBSD (electron back-scatter diffraction) attached to the FE-SEM (field emission scanning electron microscope)) or the measurement of the hardness of a micro region such as the measurement of micro-Vickers hardness.

For example, as described above, tempered martensite and bainite are different in the formation site of the carbide, the crystal orientation relationship (extension directions) of the carbide, and the like, and thus it is possible to easily differentiate tempered martensite and bainite by observing the extension directions of the iron-based carbide in lath-shaped crystal grains using FE-SEM.

The volume ratios of tempered martensite, ferrite, and bainite and/or the volume ratio of pearlite at the thickness ¼ portion of the steel sheet can be obtained by measuring the area ratios of the respective structures which are obtained by extracting a sample of which an observed section is a sheet thickness cross section parallel to the rolling direction of the steel sheet, polishing the observed section, etching the observed section with a Nital solution, and observing the thickness ¼ portion (the range of a thickness ⅛ portion to a thickness ⅜ portion around the thickness ¼ place) using FE-SEM, and considering the area ratios as the volume ratios. Meanwhile, the area ratio of each of the structures refers to the average value of the area ratios of the structure which are obtained by measuring ten visual fields at a magnification of 5,000 times.

Fresh martensite and residual austenite can be clearly differentiated from the above-described structures (tempered martensite, ferrite, and bainite) by etching a cross section of the steel sheet with a LePera solution and observing the thickness ¼ portion using FE-SEM. Therefore, the volume ratio of fresh martensite can be obtained as a difference between the area ratio of a non-corroded region observed using FE-SEM and the area ratio of residual austenite measured using X-rays.

Next, the reasons for regulating the number density of iron-based carbides in the tempered martensite to $5 \times 10^7$ (particles/mm$^2$) or more and regulating the ratio of the number of ε-type carbides with respect to the number of all of iron-based carbide to 20% or more will be described.

The number density of iron-based carbides having a major axis of 5 nm or more in the tempered martensite at the thickness ¼ portion: $5 \times 10^7$ (particles/mm$^2$) or more In the steel sheet according to the present embodiment, in order to enhance both the delayed fracture resistance properties and the formability, the number density of iron-based carbides having a major axis of 5 nm or more in the tempered martensite, which is a primary phase, in the structure at the thickness ¼ portion is regulated to $5 \times 10^7$ (particles/mm$^2$) or more. In the present embodiment, the "number density of the iron-based carbides in the tempered martensite" refers to a value obtained by dividing the number of the iron-based carbides in the tempered martensite in the observed section by the area of the tempered martensite in the observed section.

Martensite immediately after quenching has a high strength, but the delayed fracture resistance properties are poor, and thus there is a need for improvement. Therefore, martensite is tempered so as to produce tempered martensite, and, at the thickness ¼ portion, $5 \times 10^7$ (particles/mm$^2$) or more of iron-based carbides having a major axis of 5 nm are precipitated in the tempered martensite. The delayed fracture resistance properties of the tempered martensite (primary phase) is superior to that of non-tempered martensite.

The present inventors investigated the relationship between the delayed fracture resistance properties and the number density of the iron-based carbides in the tempered martensite at the thickness ¼ portion. The results are shown in FIG. 1.

The number density of the iron-based carbides was measured by extracting a sample of which an observed section is a sheet thickness cross section parallel to the rolling direction of the steel sheet, polishing the observed section, etching the observed section with a Nital solution, observing ten visual fields at the thickness ¼ portion using FE-SEM at a magnification of 5,000 times, and averaging values respectively obtained by dividing the number of iron-based carbides having a major axis of 5 nm or more, which are included in the tempered martensite in the respective visual fields, by the area of the tempered martensite in the visual field. Meanwhile, the number of iron-based carbides having a major axis of less than 5 nm was not measured. This is because iron-based carbides having a major axis of less than 5 nm do not significantly affect the delayed fracture resistance properties of the steel sheet. Hereinafter, the iron-based carbides having a major axis of 5 nm or more will be simply referred to as "iron-based carbides" in some cases.

The delayed fracture resistance properties of the steel sheet was evaluated by bending a strip-shaped test piece having a length of 100 mm, a width of 30 mm, and a thickness of 1.3 mm or 1.6 mm, which is cut out perpendicularly to the rolling direction of the steel sheet, at three points, mounting a water-resistant strain gauge on the surface of the strip-shaped test piece, then, intruding hydrogen into the strip-shaped test piece by immersing the strip-shaped test piece in an aqueous solution of thiocyan ammonium and electrolyzing the aqueous solution of thiocyan ammonium at a current density of 0.1 mA/cm², and, after two hours, confirming the presence and absence of the occurrence of cracking.

The radius of the bending processing of the strip-shaped test piece was set to 10 mm. The applied stress imparted to the strip-shaped test piece having a thickness of 1.3 mm was set to 60% of the tensile strength (TS) of the steel sheet, and the applied stress imparted to the strip-shaped test piece having a thickness of 1.6 mm was set to 90% of the tensile strength (TS) of the steel sheet. Strip-shaped test pieces that were broken at the applied stress of 60% of the tensile strength (TS) were evaluated as "VERY BAD", strip-shaped test pieces that were not broken at the applied stress of 60% of the tensile strength (TS), but broken at the applied stress of 90% of the tensile strength (TS) were evaluated as "BAD", and strip-shaped test pieces that were not broken at both applied stresses are evaluated as "GOOD".

The present inventors also found that, as shown in FIG. 1, when the number density of the iron-based carbides in the tempered martensite at the thickness ¼ portion reaches at least $5 \times 10^7$ (particles/mm²) or more, the delayed fracture resistance properties significantly improves.

Based on what has been described above, the number density of the iron-based carbides in the tempered martensite at the thickness ¼ portion is regulated to $5 \times 10^7$ (particles/mm²) or more. The number density of the iron-based carbides in the tempered martensite at the thickness ¼ portion is preferably $1 \times 10^8$ (particles/mm²) or more and more preferably $3 \times 10^8$ (particles/mm²) or more.

The delayed fracture resistance properties-improving effect of the iron-based carbides in the tempered martensite becomes more significant as the iron-based carbides becomes more small. In addition, a majority of the iron-based carbides are precipitated in martensite laths, and thus the iron-based carbides do not impair mechanical characteristics necessary for the steel sheet such as ductility and formability. Therefore, the major axis of the iron-based carbide particle in the tempered martensite is preferably smaller and preferably 350 nm or less. The major axis of the iron-based carbide particle in the tempered martensite is more preferably 250 nm or less and still more preferably 200 nm or less. Meanwhile, iron-based carbides having a major axis that is too small do not have any delayed fracture resistance properties-improving effect, and thus, in the steel sheet according to the present embodiment, iron-based carbides having a major axis of less than 5 nm are not taken into account.

Meanwhile, as described above, the thickness ¼ portion is located in the middle between the central surface of the steel sheet and the surface of the sheet and thus has an average structure. Therefore, in the steel sheet according to the present embodiment, when the number density of the iron-based carbides in the tempered martensite at the thickness ¼ portion is in a preferred range, favorable characteristics are obtained throughout the entire steel sheet.

The ratio of the number of ε-type carbides with respect to the number of all of the iron-based carbides: 20% or more The ratio of the number of ε-type carbides with respect to the number of all of the iron-based carbides in the tempered martensite according to the present embodiment (hereinafter, in some cases, simply referred to as "the ratio of the ε-type carbides") is set to 20% or more. In such a case, the delayed fracture resistance properties can be improved without impairing the formability, particularly, the hole expansibility.

The iron-based carbide in the tempered martensite is mainly cementite ($Fe_3C$). It is considered that, generally, the interface between primary-phase iron (bcc structure) and cementite ($Fe_3C$) acts as a trap site for trapping hydrogen. Therefore, the presence of cementite is said to contribute to the improvement of the delayed fracture resistance properties.

However, cementite serves as a starting point of ductile fracture, and thus it is difficult to improve both formability and delayed fracture resistance properties using cementite alone.

As a result of intensive studies, the present inventors obtained an idea that, when, among a variety of iron-based carbides, an ε-type carbide ($Fe_{2.4}C$) is used, both the delayed fracture resistance properties and the formability can be improved.

In the iron-based carbide made up of Fe and C, the ε-type carbide, a χ-type carbide, and cementite (θ-type carbide) which have different crystal structures are present. These iron-based carbides are precipitated in a state of having a specific crystal orientation relationship with iron having the bcc structure of the primary phase in martensite.

Among a variety of iron-based carbides described above, the ε-type carbide ($Fe_{2.4}C$) and iron having a bcc structure form an interface that is similar to a coherent interface (an interface between two phases, in which all atoms satisfy a relationship of the nearest neighbor atom in the respective phases). The interface between the ε-type carbide ($Fe_{2.4}C$) and iron (bcc structure) is superior to the interface between cementite and iron (bcc structure) in terms of coherence, and thus the hydrogen-trapping capability of the ε-type carbide is assumed to be better than that of cementite. In addition, the ε-type carbide is finer than cementite and thus does not easily serve as a starting point of ductile fracture.

Therefore, the present inventors pay attention to the ε-type carbide ($Fe_{2.4}C$) and investigate the relationship between the ratio of the ε-type carbide with respect to the iron-based carbide and the delayed fracture resistance properties. The results are shown in FIG. 2.

The ε-type carbide (hexagonal crystal) and cementite (orthorhombic crystal) have different crystal structures and thus have different difratio patterns in X-ray difratio or electron beam difratio and can be easily differentiated from each other. The present inventors observed thin-film samples using an electronic microscope and identified the kind of the iron-based carbide. The iron-based carbide was irradiated with electron beams, and the obtained difratio pattern was analyzed, thereby identifying the ε-type carbide ($Fe_{2.4}C$).

The ratio of the ε-type carbide ($Fe_{2.4}C$) with respect to the iron-based carbide in each of the samples was computed by setting the observation magnification to 10,000 times and averaging the ratios of the ε-type carbide ($Fe_{2.4}C$) in 10 visual fields which were obtained by measuring the respective visual fields. The delayed fracture resistance properties were evaluated using the above-described evaluation method.

Figure 2:
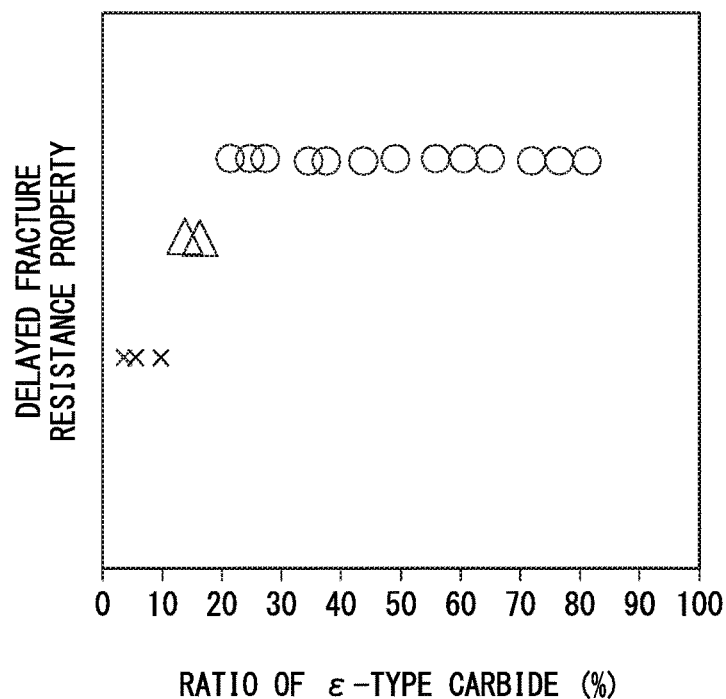
FIG. 2 is a visual field showing a relationship between the ratio of ε-type carbides with respect to iron-based carbides and the delayed fracture resistance properties.

From FIG. 2, it is found that, when the ratio of the ε-type carbide ($Fe_{2.4}C$) with respect to the iron-based carbide is set to 20% or more, excellent processing characteristics and excellent delayed fracture resistance properties can be ensured. In order to further improve the processing characteristics and the delayed fracture resistance properties, the ratio of the ε-type carbide ($Fe_{2.4}C$) with respect to the iron-based carbide is preferably 30% or more and more preferably 40% or more.

Meanwhile, when the ratio of the ε-type carbide with respect to the iron-based carbide is less than 20%, the delayed fracture resistance properties deteriorate, and favorable processing characteristics cannot be obtained.

As described above, the thickness ¼ portion is located in the middle between the central surface of the steel sheet and the surface of the sheet and thus has an average structure. Therefore, in the steel sheet according to the present embodiment, when the ratio of the ε-type carbide with respect to the iron-based carbide in the tempered martensite at the thickness ¼ portion is set in the preferred range, favorable characteristics can be obtained throughout the entire steel sheet.

In the galvanized steel sheet according to the present embodiment, a hot-dip galvanized layer including 15 mass % or less of Fe and a remainder consisting of Zn, Al, and impurities is formed on the surface of the steel sheet according to the present embodiment. Generally, the concentration of Fe in the hot-dip galvanized layer is often less than 7 mass %. The lower limit value of the concentration of Fe in the hot-dip galvanized layer is not particularly limited, but is preferably set to 1.0 mass %.

In the galvannealed steel sheet according to the present embodiment, a hot-dip galvanized layer including 15 mass % or less of Fe and a remainder of Zn, Al, and impurities is formed on the surface of the steel sheet according to the present embodiment and alloyed. The lower limit value of the concentration of Fe in the galvannealed layer is not particularly limited; however, generally, the lower limit value is frequently set to 7 mass %.

Next, methods for manufacturing the steel sheet, the hot-dip galvanized steel sheet, and the galvannealed steel sheet according to the present embodiment will be described.

First, a method for manufacturing the steel sheet of the present invention will be described.

In a method for manufacturing the steel sheet of the present invention, (a) a cast slab having the same composition as the steel sheet according to the present embodiment is
  (a1) directly hot-rolled and then coiled, or
  (a2) temporarily cooled and then heated so as to be hot-rolled and then coiled,
(b) pickled and then cold-rolled and, subsequently, annealed, after then,
(c) the annealed steel sheet is cooled in two stages and then tempered, and, after then,
(d) the tempered steel sheet is further cooled in two stages.

(d) is an important process for setting the ratio of the ε-type carbide with respect to the iron-based carbide to 20% or more.

The cast slab that is subjected to hot-rolling simply needs to be a cast slab and is not limited to specific cast slabs. For example, the cast slab may be a continuous cast slab or a slab produced using a thin slab caster. The cast slab is subjected to hot-rolling. In this case, the cast slab may be directly subjected to hot-rolling after casting or subjected to hot-rolling after temporary cooling and subsequent reheating.

In a case in which the cast slab is directly subjected to continuous casting and direct rolling (CC-DR) or hot-rolling, it is necessary to heat the cast slab to a temperature at which the hot-rolling can be completed in a temperature range that is equal to or higher than the $Ar_3$ transformation point (the temperature at which ferritic transformation begins during the cooling of steel) at the time of starting the hot-rolling. This is because, when the finish rolling temperature is in a two-phase temperature range of (austenite+ferrite), the structure of the hot-rolled steel sheet becomes significantly uneven, and the formability of the finally-obtained steel sheet deteriorates.

In some cases, the steel sheet according to the present embodiment which has a maximum tensile strength of 780 MPa or higher includes a large content of alloying elements. In this case, the rolling force for hot-rolling the cast slab increases, and thus it is preferable to hot-roll the cast slab at a high temperature. For what has been described above, the finish rolling temperature is set to be equal to or higher than the $Ar_3$ transformation point.

As a result of experiments, the present inventors confirmed that, for example, in a case in which the heating temperature before the hot-rolling is set to approximately 1,120° C., and the finish rolling completion temperature is set to 920° C., the finally-obtained steel sheet has favorable formability.

Meanwhile, during the hot-rolling, rough rolled sheets may be joined together and continuously hot-rolled or a rough rolled sheet may be temporarily coiled and then hot-rolled.

The coiling temperature after the completion of the hot-rolling needs to be set to a temperature at which the pickling property does not degrade due to an excess increase in the thickness of oxides being generated on the surface of the steel sheet. In addition, the coiling temperature after the completion of the hot-rolling needs to be set to a temperature at which the formability of final products does not deteriorate due to the unevenness of the structure after the annealing becoming significant due to the generation of coarse ferrite or pearlite in the hot-rolled structure.

As a result of experiments, the present inventors confirmed that, for example, in a case in which the coiling temperature is set to approximately 590° C., the annealed structure becomes finer, the strength-ductility balance is improved, and furthermore, a secondary phase is uniformly dispersed, whereby the formability of the finally-obtained steel sheet is improved.

The coiled hot-rolled steel sheet is uncoiled, pickled, and cold-rolled, thereby obtaining a cold-rolled steel sheet. When oxides on the surface of the hot-rolled steel sheet are removed by pickling, the chemical convertibility and the plating property of the cold-rolled steel sheet improve. The pickling may be carried out once or a plurality of times.

The pickled hot-rolled steel sheet needs to be cold-rolled at a rolling reduction that is high enough to maintain the shape of the cold-rolled steel sheet flat and impart sufficient ductility to final products. On the other hand, in a case in which the rolling reduction is too high, the rolling force becomes excessively high, and rolling becomes difficult. As a result of experiments, the present inventors confirmed that, for example, in a case in which the cumulative rolling reduction (cold-rolling ratio) during the cold-rolling is set to 50%, preferable results are obtained. On the other hand, in a case in which a slab having the chemical composition of the steel sheet according to the present embodiment is cold-rolled at a cumulative rolling reduction during the cold-rolling set to 90%, cracks are generated in the steel sheet. Meanwhile, the number of rolling passes and the rolling reductions in the respective passes are not particularly limited.

Next, the cold-rolled steel sheet is annealed. The annealing is preferably continuous annealing in order to enhance manufacturability.

In a case in which the annealing temperature is insufficiently high (for example, about 750° C.), it is not possible to sufficiently generate martensite in the annealed cold-rolled steel sheet, and thus it is difficult to set the volume ratio of tempered martensite with respect to the finally-obtained steel sheet to 30% or more.

On the other hand, in a case in which the annealing temperature is too high (for example, about 1000° C.), an increase in production costs is caused, which is not preferable economically, furthermore, the shape of the steel sheet becomes poor, and, for example, troubles such as the shortening of the service lives of rolls that transport steel sheets in continuous annealing facilities are induced. In addition, in a case in which the annealing temperature is too high, martensite included in cold-rolled steel sheet after annealing become excessive, and the volume ratio of tempered martensite of the finally-obtained steel sheet exceeds 70%.

In addition, in a case in which the annealing time is insufficient (for example, approximately one second), it is not possible to dissolve iron-based carbides generated during the hot-rolling, and the content of martensite included in the annealed cold-rolled steel sheet is insufficient, and thus it is not possible to set the volume ratio of tempered martensite with respect to the finally-obtained steel sheet to 30% or more. On the other hand, in a case in which the annealing time is too long, an increase in production costs is caused, which is not preferable economically.

As a result of experiments, the present inventors confirmed that, for example, in a case in which the annealing temperature is set to approximately 840° C., and the annealing time is set to approximately 100 seconds, it is possible to obtain the amount of tempered martensite in the finally-obtained steel sheet in an appropriate range.

The cold-rolled steel sheet after the end of the annealing is cooled. In order to secure a sufficient amount of ferrite, it is necessary that the cooling is two-stage cooling in which the cooling rate is changed depending on cooling temperature range. Hereinafter, there are cases in which two-stage cooling carried out after the annealing and before tempering will be referred to as primary two-stage cooling, and primary cooling and secondary cooling included in the primary two-stage cooling will be referred to as primary cooling and secondary cooling, respectively.

In a case in which the cooling stop temperature of the primary cooling is lower than 500° C., a sufficient amount of ferrite cannot be secured and formability is deteriorated, and thus, the cooling stop temperature is 500° C. or more. On the other hand, in a case in which the cooling stop temperature of the primary cooling is higher than a temperature at which transformation from austenite to ferrite occurs, a sufficient amount of ferrite cannot be secured similar to the case in which the cooling stop temperature is less than 500° C.

The cooing rate until the cooling stop temperature during the primary cooling is 0.5 to 200° C./sec. In a case in which the cooing rate until the cooling stop temperature during the primary cooling is less than 0.5° C./sec, pearlite forms and it is not possible to set the volume ratio of tempered martensite of the finally-obtained steel sheet to 30% or more. On the other hand, it is difficult to realize a cooling rate of more than 200° C./sec, and thus, the cooing rate until the cooling stop temperature during the primary cooling is 200° C./sec or lower.

In a case in which the cooling stop temperature of the secondary cooling is lower than 100° C., ferrite or bainite cannot be secured and formability is deteriorated, and thus, the cooling stop temperature is 100° C. or more. In a case in which the cooling stop temperature of the secondary cooling is higher than 450° C., the total volume ratio of ferrite and bainite is lower than 20% and formability cannot be ensured, and thus, the cooling stop temperature is 450° C. or less.

In a case in which the cooing rate during the secondary cooling is less than 1° C./sec, the total volume ratio of ferrite and bainite of the finally-obtained steel sheet is lower than 20% and formability cannot be ensured, and thus, the cooling rate is 1° C./sec or more. On the other hand, it is difficult to realize a cooling rate of more than 200° C./sec, and thus, the cooing rate until the cooling stop temperature during the secondary cooling is 200° C./sec or lower.

Meanwhile, the cooling method may be any of roll cooling, air cooling, water cooling, and the joint use thereof.

As a result of experiments, the present inventors confirmed that, for example, in a case in which primary cooling is carried out at a cooling rate of 2° C./sec and secondary cooling is carried out at a cooling rate of 45° C./sec, the total amount of one or both of ferrite and bainite falls in appropriate ranges.

In the above-described two-stage cooling, the cold-rolled steel sheet is tempered, thereby controlling the microstructure. Due to this tempering, martensite in the cold-rolled steel sheet is tempered so that 20 volume % or more of tempered martensite is formed, and the number density of the iron-based carbides in the tempered martensite of $5 \times 10^7$ (particles/mm$^2$) or more is obtained.

In the tempering, the temperature of the steel sheet is maintained at a predetermined retention temperature (constant temperature retention temperature) only for a predetermined time (constant temperature retention time). In a case in which the retention temperature in the tempering is too low (for example, approximately 150° C.), it is difficult to obtain the number density of the iron-based carbides of $5 \times 10^7$ (particles/mm$^2$) or more, and it is not possible to obtain sufficient delayed fracture resistance properties.

On the other hand, in a case in which the retention temperature in the tempering is too high (for example, approximately 550° C.), martensite is excessively tempered, and the tensile strength of the steel sheet that is finally obtained reaches less than 780 MPa. In addition, when the retention temperature in the tempering is too high, precipitated iron-based carbides coarsen, and the delayed fracture resistance properties do not improve.

In a case in which the retention time in the tempering is insufficient (for example, approximately one second), martensite is insufficiently tempered, and it is difficult to obtain the number density of the iron-based carbides of $5 \times 10^7$ (particles/mm$^2$) or more.

As a result of experiments, the present inventors confirmed that, for example, in a case in which the retention temperature in the tempering is set to approximately 400° C., and the retention time in the tempering is set to approximately 290 seconds, it is possible to obtain the tempered martensite content and the number density of iron-based carbides in the steel sheet that is finally obtained in appropriate ranges.

After being held at the above-described temperature, the steel sheet is cooled so that 20% or more of the iron-based carbide in the tempered martensite turns into the ε-type carbide.

As described above, the iron-based carbide refers to the ε-type carbide, a χ-type carbide, and cementite (θ-type carbide) having different crystal structures. Among a variety of iron-based carbides described above, the ε-type carbide ($Fe_{2.4}C$) forms an interface that is similar to a coherent interface together with iron having a bcc structure and thus has a high hydrogen-trapping capability. Furthermore, the ε-type carbide is finer than cementite and thus does not easily serve as a starting point of ductile fracture.

The present inventors assume that the ε-type inclusion content is affected not only by the cooling conditions in the tempering but also by the content of C, the cooling temperature in the annealing, the retention temperature in the tempering, and the retention time in the tempering. In order to obtain necessary ε-type inclusions, it is necessary to determine production conditions in consideration of the interaction among the above-described factors that control the ε-type inclusion content.

As a result of a variety of experiments, the present inventors found that, in order to improve the delayed fracture resistance properties by generating a number of ε-type carbides, it is necessary to carry out two-stage cooling which is carried out at different cooling rates in a temperature range of the retention temperature to approximately 350° C. and in a temperature range of approximately 350° C. to 100° C. respectively. Hereinafter, in some cases, two-stage cooling after tempering will be referred as secondary two-stage cooling, cooling carried out in a temperature range of the retention temperature to approximately 350° C. included in the secondary two-stage cooling will be referred to as tertiary cooling, and cooling carried out in a temperature range of approximately 350° C. to 100° C. will be referred to as fourthly cooling.

According to the experiments by the present inventors, in a case in which the cooling rate in the range of the tertiary cooling is too slow (for example, approximately 1° C./sec) or too fast (for example, approximately 75° C./sec) or in a case in which the cooling rate in the range of the fourthly cooling is too slow (for example, approximately 1° C./sec) or too fast (for example, approximately 65° C./sec), the ε-type carbide content is insufficient.

According to the experiments by the present inventors, it was found that, when the temperature at which the cooling rate is changed is set to 350° C.±10° C., necessary effects can be obtained. On the other hand, in a case in which the temperature at which the cooling rate is changed is too low (for example, approximately 200° C.), the ε-type carbide content is insufficient. Furthermore, in a case in which the end temperature of the secondary two-stage cooling is too high (for example, approximately 200° C.), the ε-type carbide content is insufficient.

The present inventors found that, for example, when the content of C is set to 0.06%, the annealing conditions and the retention time and the retention temperature in the tempering are set to values exemplified above, the cooling rate in the temperature range of the retention temperature to 350° C. is set to approximately 12° C./sec, the cooling rate in the temperature range of 350° C. to 100° C. is set to approximately 16° C./sec, and the end temperature of the secondary two-stage cooling is set to 100° C. or lower, the production of steel sheets in which the number density of the iron-based carbides is $5 \times 10^7$ particles/mm$^2$ or more and the ratio of the ε-type carbide with respect to the iron-based carbide at the thickness ¼ portion is 20% or more is feasible.

In addition, as described above, the ε-type carbide ($Fe_{2.4}C$) is finer than cementite and does not easily serve as a starting point of ductile fracture, and thus it is possible to significantly enhance the delayed fracture resistance properties while maintaining the formability.

The mechanism of the significant improvement of the delayed fracture resistance properties are not clear, but it is assumed that nuclei of the fine ε-type carbide are generated in the tempered martensite during the above-described temperature retention, and the fine ε-type carbide is generated in the subsequent two-stage cooling.

Next, a method for manufacturing the galvanized steel sheet according to the present embodiment and a method for manufacturing the galvannealed steel sheet according to the present embodiment will be described.

In the method for manufacturing the galvanized steel sheet according to the present embodiment, (a) a cast slab having the same composition as the steel sheet according to the present embodiment is (a1) directly hot-rolled and then coiled, or (a2) temporarily cooled and then heated so as to be hot-rolled and then coiled, (b) pickled and then cold-rolled and, subsequently, annealed, after then, (c1) the annealed steel sheet is cooled in two stages so as to adjust the temperature of the steel sheet to near the temperature of a hot-dip galvanizing bath, and then the steel sheet is hot-dip galvanized, or (c2) the annealed steel sheet is cooled in two stages, further cooled to room temperature, and, after then, heated to near the temperature of a hot-dip galvanizing bath so as to be hot-dip galvanized, and (d) the hot-dip galvanized steel sheet is further cooled in two stages.

The hot-dip galvanized layer includes 15 mass % or less of Fe and a remainder consisting of Zn, Al, and impurities.

In a case in which a plated layer including less than 7 mass % of Fe is formed on the steel sheet, generally, the steel sheet is often used as a hot-dip galvanized steel sheet without carrying out any alloying treatment on the plated layer. On the other hand, in a case in which a plated layer including 7 mass % or more of Fe is formed on the steel sheet, generally, an alloying treatment is carried out on the plated layer, and the steel sheet is used as a galvannealed steel sheet in many cases.

(a) and (b) of the method for manufacturing the galvanized steel sheet according to the present embodiment are the same as (a) and (b) of the method for manufacturing the steel sheet according to the present embodiment. In addition, in (d) of the method for manufacturing the galvanized steel sheet according to the present embodiment, similar to in the method for manufacturing the steel sheet according to the present embodiment, it is necessary to carry out the two-stage cooling.

In the method for manufacturing the galvanized steel sheet according to the present embodiment, after the annealing, the steel sheet is cooled in two stages, then the temperature of the steel sheet is adjusted to near the temperature of a hot-dip galvanizing bath, and then the steel sheet is hot-dip galvanized, or, after the annealing, the steel sheet is cooled in two stages, then, further cooled to room temperature, after then, heated to near the temperature of a hot-dip galvanizing bath, and then the steel sheet is hot-dip galvanized. The two-stage cooling carried out between the annealing and the hot-dip galvanizing is carried out in the same manner as the two-stage cooling included in (c) of the method for manufacturing the steel sheet according to the present embodiment described above.

The hot-dip galvanizing is carried out by adjusting the temperature of the steel sheet to near the temperature of the hot-dip galvanizing bath and then immersing the steel sheet in the hot-dip galvanizing bath. When the steel sheet is immersed in the hot-dip galvanizing bath after adjusting the temperature of the steel sheet to near the temperature of the hot-dip galvanizing bath, it is possible to highly adhesively and uniformly form a hot-dip galvanized layer on the surface of the steel sheet.

The steel sheet after annealing is cooled in two stages to near the temperature of a galvanizing bath, or is cooled in two stages and further cooled to room temperature. If the cooling rate is insufficient in the two-stage cooling, a part of residual austenite is decomposed and forms carbides, and thus, formability is deteriorated.

In a case in which the temperature at which the steel sheet is immersed in the hot-dip galvanizing bath is too low, a large amount of heat may be removed and some of molten zinc may solidify during the immersion of the steel sheet in the hot-dip galvanizing bath, and thus the plate appearance may deteriorated. On the other hand, in a case in which the temperature at which the steel sheet is immersed in the hot-dip galvanizing bath is too high, there are cases in which the temperature of the plating bath increases and operation troubles are induced. Meanwhile, the plating bath may include, in addition to pure zinc, Fe, Al, Mg, Mn, Si, Cr, and the like.

In the method for manufacturing the hot-dip galvanized steel sheet according to the present embodiment, the immersion of the steel sheet in the hot-dip galvanizing bath controls the microstructure in the same manner as the tempering of the steel sheet according to the present embodiment. When the thermal history of the steel sheet during the immersion is the same as the thermal history during the tempering of the steel sheet according to the present embodiment described above, the immersion of the steel sheet in the hot-dip galvanizing bath does not impair the characteristics of the steel sheet.

After the formation of the hot-dip galvanized layer on the surface of the steel sheet, in (d) of the method for manufacturing the galvanized steel sheet according to the present embodiment, it is necessary to carry out the two-stage cooling in the same manner as in (d) of the method for manufacturing the steel sheet according to the present embodiment.

The combination of the retention in the plating bath and the two-stage cooling after the plating precipitates fine iron-based carbides in the tempered martensite, that is a primary phase of a necessary structure, at a number density of $5 \times 10^7$ (particles/mm$^2$) or more, provides a ratio of the ε-type carbide with respect to the iron-based carbide of 20% or more, and enables the significant enhancement of the delayed fracture resistance properties while maintaining the formability.

In the method for manufacturing the galvannealed steel sheet according to the present embodiment, (a) a cast slab having the same composition as the steel sheet according to the present embodiment is
  (a1) directly hot-rolled and then coiled, or
  (a2) temporarily cooled and then heated so as to be hot-rolled and then coiled,
(b) pickled and then cold-rolled and, subsequently, annealed, after then,
(c-1) the annealed steel sheet is cooled in two stages so as to adjust the temperature of the steel sheet to near the temperature of a hot-dip galvanizing bath, then, hot-dip galvanized, and subsequently, alloy-treated, or
(c-2) the annealed steel sheet is cooled in two stages, further cooled to room temperature, after then, heated to near the temperature of a galvanizing bath so as to be hot-dip galvanized, and subsequently, alloy-treated, and
(d) the alloy-treated steel sheet is further cooled in two stages.

Furthermore, in the method for manufacturing the galvannealed steel sheet according to the present embodiment, subsequent to (d), (e) the alloy-treated steel sheet may be reheated so as to be heat-treated and then cooled to room temperature.

The galvannealed layer includes 15 mass % or less of Fe and a remainder consisting of Zn, Al, and impurities.

The method for manufacturing the galvannealed steel sheet according to the present embodiment is the method for manufacturing the galvanized steel sheet of the present invention to which the process of alloying the hot-dip galvanized layer is added. When the alloying temperature is not sufficiently high, a highly adhesive alloying layer is not formed, and, on the other hand, when the alloying temperature is too high, the alloying layer becomes too thick, and the formability of the plated layer degrades.

As a result of experiments, the present inventors confirmed that, for example, in a case in which the alloying temperature is set to approximately 480° C., galvannealed steel sheets having a favorable alloyed layer can be obtained.

In the method for manufacturing the galvannealed steel sheet according to the present embodiment, after the alloying and the two-stage cooling, the heat treatment may be carried out again so that the ratio of the ε-type carbide, which forms interfaces having a favorable hydrogen-trapping capability, with respect to the iron-based carbide is increased.

Examples

Next, examples of the present invention will be described, but conditions in the examples are simply examples of conditions employed to confirm the feasibility and effects of the present invention, and the present invention is not limited to these examples of conditions. The present invention is capable of employing a variety of conditions within the scope of the gist of the present invention as long as the object of the present invention is achieved.

A method for manufacturing an example of a steel sheet included (a) (a1) directly hot-rolling and then coiling a cast slab having a composition shown in the tables or (a2) temporarily cooling, then, heating, hot-rolling, and then coiling the cast slab, (b) pickling, then, cold-rolling, and, subsequently, annealing, after then, (c) cooling in two stages and then tempering the annealed steel sheet, and, after then, (d) further cooling the tempered steel sheet in two stages.

A method for manufacturing an example of a hot-dip galvanized steel sheet included (a) (a1) directly hot-rolling and then coiling a cast slab having a composition shown in the tables or (a2) temporarily cooling, then, heating, hot-rolling, and then coiling the cast slab, (b) pickling, then, cold-rolling, and, subsequently, annealing, after then, (c1) cooling the annealed steel sheet in two stages so as to adjust the temperature of the steel sheet to near a temperature of a hot-dip galvanizing bath, and then hot-dip galvanizing the steel sheet or (c2) cooling the annealed steel sheet in two stages, further cooling the steel sheet to room temperature, after then, heating the steel sheet to near the temperature of a hot-dip galvanizing bath, and hot-dip galvanizing the steel sheet, and (d) further cooling the hot-dip galvanized steel sheet in two stages.

A method for manufacturing an example of a galvannealed steel sheet included (a) (a1) directly hot-rolling and then coiling a cast slab having a composition shown in the tables or (a2) temporarily cooling, then, heating, hot-rolling, and then coiling the cast slab, (b) pickling, then, cold-rolling, and, subsequently, annealing, after then, (c-1) cooling the annealed steel sheet in two stages so as to adjust the temperature of the steel sheet to near the temperature of a hot-dip galvanizing bath, and then hot-dip galvanizing and, subsequently, alloy-treating the steel sheet, or (c-2) cooling the annealed steel sheet in two stages, further cooling the steel sheet to room temperature, after then, heating the steel sheet to near the temperature of a galvanizing bath so as to be hot-dip galvanized, and subsequently, alloy-treating the steel sheet, and (d) further cooling the alloying-treated steel sheet in two stages.

All of the hot-rolled steel sheets were pickled according to a normal method. In all of examples and comparative examples (excluding cases in which cracking occurred during hot-rolling or cold-rolling), the sheet thickness after the hot-rolling was 3.2 mm, the primary cooling rate was 2° C./sec, and the secondary cooling rate was 45° C./sec. Other production conditions were as shown in the tables. Reference Sign "*1" in the tables indicates that cracking was observed during cold-rolling and thus the production stopped, and Reference Sign "*2" in the tables indicates that cracking was observed during hot-rolling and thus the production stopped. For examples having Reference Sign "1" or "*2", the characteristics were not evaluated. For examples having "NO" regarding plating, plating was not carried out. For examples having "YES" regarding plating and "NO" regarding alloying, hot-dip galvanizing was carried out, and examples having "YES" regarding both plating and alloying, hot-dip galvanizing was carried out.

TABLE 1

| Steel No. | Chemical Composition (mass %) | | | | | | |
|---|---|---|---|---|---|---|---|
| | C | Si | Mn | P | S | N | O |
| A | 0.06 | 0.46 | 2.2 | 0.012 | 0.0024 | 0.0021 | 0.0016 |
| B | 0.05 | 0.47 | 2.1 | 0.012 | 0.0021 | 0.0019 | 0.0014 |
| C | 0.06 | 0.48 | 2.2 | 0.100 | 0.0024 | 0.0021 | 0.0016 |
| D | 0.06 | 0.46 | 2.2 | 0.014 | 0.0021 | 0.0023 | 0.0016 |
| E | 0.06 | 0.48 | 2.1 | 0.012 | 0.0024 | 0.0021 | 0.0018 |
| F | 0.05 | 0.46 | 2.2 | 0.012 | 0.0024 | 0.0021 | 0.0016 |
| G | 0.05 | 0.46 | 2.1 | 0.012 | 0.0022 | 0.0022 | 0.0016 |
| H | 0.05 | 0.45 | 2.1 | 0.012 | 0.0023 | 0.0021 | 0.0018 |
| I | 0.06 | 0.46 | 2.3 | 0.012 | 0.0021 | 0.0021 | 0.0015 |

TABLE 1-continued

| Steel No. | Chemical Composition (mass %) | | | | | | |
|---|---|---|---|---|---|---|---|
| | C | Si | Mn | P | S | N | O |
| J | 0.06 | 0.47 | 2.2 | 0.011 | 0.0024 | 0.0021 | 0.0013 |
| K | 0.06 | 0.47 | 2.2 | 0.012 | 0.0021 | 0.0019 | 0.0016 |
| L | 0.01 | 0.45 | 2.2 | 0.013 | 0.0024 | 0.0021 | 0.0015 |
| M | 0.10 | 0.46 | 2.2 | 0.012 | 0.0022 | 0.0021 | 0.0013 |
| N | 0.70 | 0.48 | 2.1 | 0.012 | 0.0021 | 0.0018 | 0.0013 |
| O | 0.06 | 0.01 | 2.2 | 0.011 | 0.0024 | 0.0021 | 0.0016 |
| P | 0.06 | 0.46 | 2.2 | 0.013 | 0.0021 | 0.0021 | 0.0018 |
| Q | 0.05 | 0.46 | 2.2 | 0.011 | 0.0024 | 0.0019 | 0.0016 |
| R | 0.06 | 0.46 | 2.2 | 0.011 | 0.0022 | 0.0018 | 0.0016 |
| S | 0.05 | 0.46 | 2.1 | 0.012 | 0.0021 | 0.0021 | 0.0013 |
| T | 0.06 | 0.49 | 2.2 | 0.011 | 0.0023 | 0.0019 | 0.0016 |
| U | 0.05 | 0.46 | 2.2 | 0.013 | 0.0024 | 0.0023 | 0.0015 |
| V | 0.07 | 0.45 | 2.1 | 0.012 | 0.0022 | 0.0018 | 0.0018 |
| W | 0.06 | 0.45 | 2.2 | 0.012 | 0.0024 | 0.0021 | 0.0015 |
| X | 0.05 | 0.46 | 2.1 | 0.012 | 0.0021 | 0.0023 | 0.0015 |
| Y | 0.06 | 1.20 | 2.2 | 0.011 | 0.0022 | 0.0018 | 0.0016 |
| Z | 0.05 | 0.46 | 0.1 | 0.011 | 0.0021 | 0.0018 | 0.0015 |
| AA | 0.06 | 0.49 | 2.1 | 0.012 | 0.0023 | 0.0023 | 0.0016 |
| BB | 0.05 | 0.46 | 4.0 | 0.013 | 0.0021 | 0.0021 | 0.0015 |
| CC | 0.06 | 0.49 | 2.2 | 0.011 | 0.0022 | 0.0023 | 0.0015 |
| DD | 0.05 | 0.45 | 2.2 | 0.012 | 0.0021 | 0.0019 | 0.0015 |
| EE | 0.05 | 0.46 | 2.2 | 0.014 | 0.0024 | 0.0023 | 0.0015 |
| FF | 0.06 | 0.48 | 2.2 | 0.013 | 0.0024 | 0.0021 | 0.0016 |
| GG | 0.05 | 0.46 | 2.2 | 0.014 | 0.0024 | 0.0019 | 0.0016 |
| HH | 0.06 | 0.47 | 2.3 | 0.011 | 0.0022 | 0.0019 | 0.0016 |
| II | 0.05 | 0.46 | 2.1 | 0.012 | 0.0022 | 0.0023 | 0.0016 |
| JJ | 0.05 | 0.44 | 2.2 | 0.013 | 0.0024 | 0.0018 | 0.0015 |
| KK | 0.06 | 0.45 | 2.2 | 0.011 | 0.0023 | 0.0021 | 0.0016 |
| LL | 0.06 | 0.46 | 2.2 | 0.014 | 0.0021 | 0.0021 | 0.0013 |
| MM | 0.06 | 0.47 | 2.1 | 0.012 | 0.0021 | 0.0019 | 0.0015 |
| NN | 0.06 | 0.44 | 2.1 | 0.011 | 0.0023 | 0.0023 | 0.0016 |
| OO | 0.05 | 0.43 | 2.2 | 0.012 | 0.0022 | 0.0018 | 0.0018 |
| PP | 0.05 | 0.46 | 2.2 | 0.011 | 0.0021 | 0.0021 | 0.0018 |
| QQ | 0.06 | 0.47 | 2.1 | 0.011 | 0.0023 | 0.0023 | 0.0015 |
| RR | 0.08 | 0.49 | 2.2 | 0.012 | 0.0024 | 0.0021 | 0.0016 |

TABLE 2

| Steel No. | Chemical Composition | | | | | | | | | | | | Ar₃ transformation point (° C.) |
|---|---|---|---|---|---|---|---|---|---|---|---|---|---|
| | Al | Cr | Mo | Ni | Cu | Nb | Ti | V | B | Ca | Mg | REM | |
| A | 0.033 | | | | | | | | | | | | 820 |
| B | 3.000 | | | | | | | | | | | | 816 |
| C | 0.033 | | | | | | | | | | | | 816 |
| D | 0.028 | 0.06 | | | | | | | | | | | 820 |
| E | 0.033 | 0.12 | | | | | | | | | | | 820 |
| F | 0.028 | 2.00 | | | | | | | | | | | 816 |
| G | 0.031 | | 0.02 | | | | | | | | | | 820 |
| H | 0.033 | | | | 0.12 | | | | | | | | 820 |
| I | 0.031 | | | | 2.00 | | | | | | | | 816 |
| J | 0.033 | | | | | 0.008 | | | | | | | 820 |
| K | 0.028 | | | 0.12 | | | | | | | | | 820 |
| L | 0.033 | | | | | | | | | | | | 820 |
| M | 0.029 | | | | | | | | | | | | 820 |
| N | 0.031 | | | | | | | | | | | | 820 |
| O | 0.031 | | | | | | | | | | | | 820 |
| P | 0.028 | | | | | | | | 0.008 | | | | 820 |
| Q | 0.033 | | | | | | | | 0.016 | | | | 820 |
| R | 0.029 | | | | | | 0.008 | | | | | | 820 |
| S | 0.033 | | | | | | 0.160 | | | | | | 820 |
| T | 0.029 | | | | | | | 0.0003 | | | | | 820 |
| U | 0.031 | | | | | | | 0.0005 | | | | | 820 |
| V | 0.033 | | | | | | | | | | | | 820 |
| W | 0.029 | | | | | | | | 0.1000 | | | | 815 |
| X | 0.031 | | | | | | | | | 0.0008 | | | 820 |
| Y | 0.031 | | | | | | | | | | | | 820 |
| Z | 0.031 | | | | | | | | | | | | 820 |
| AA | 0.029 | | | | | | | | | | | | 820 |
| BB | 0.033 | | | | | | | | | | | | 816 |
| CC | 0.028 | | | | | | | | | | | | 820 |
| DD | 0.033 | | 2.00 | | | | | | | | | | 816 |
| EE | 0.028 | | | | | 0.020 | | | | | | | 820 |

TABLE 2-continued

| Steel No. | Chemical Composition | | | | | | | | | | | | Ar₃ transformation point (° C.) |
|---|---|---|---|---|---|---|---|---|---|---|---|---|---|
| | Al | Cr | Mo | Ni | Cu | Nb | Ti | V | B | Ca | Mg | REM | |
| FF | 0.031 | | | | | | | | 0.0015 | | | | 820 |
| GG | 0.029 | | | | | | | | 0.1000 | | | | 816 |
| HH | 0.029 | | 0.06 | | | | | | | | | | 820 |
| II | 0.033 | | 2.00 | | | | | | | | | | 817 |
| JJ | 0.033 | | | 0.06 | | | | | | | | | 820 |
| KK | 0.029 | | | | 0.06 | | | | | | | | 820 |
| LL | 0.028 | | | | | | | | | 0.0008 | | | 820 |
| MM | 0.033 | | | | | | | | | 0.0015 | | | 820 |
| NN | 0.033 | | | | | | | | | 0.1000 | | | 815 |
| OO | 0.029 | | | | | | | | | | 0.0008 | | 820 |
| PP | 0.033 | | | | | | | | | | 0.0015 | | 820 |
| QQ | 0.033 | | | | | | | | | | 0.1000 | | 820 |
| RR | 0.033 | | | | | | | | | | | | 820 |

TABLE 3

| | | Hot-rolling | | Coiling | Cold-rolling | Annealing | | Primary two-stage cooling | |
|---|---|---|---|---|---|---|---|---|---|
| Production No. | Steel No. | Heating temperature (° C.) | Finish rolling completion temperature (° C.) | Coiling temperature (° C.) | Cold-rolling reduction (%) | Annealing temperature (° C.) | Annealing time (s) | Primary cooling stop temperature (° C.) | Secondary cooling stop temperature (° C.) |
| 1 | A | 1115 | 916 | 590 | 50 | 840 | 98 | 672 | 405 |
| 2 | A | 1129 | 917 | 590 | 50 | 840 | 98 | 672 | 405 |
| 3 | A | 1128 | 918 | 590 | 50 | 840 | 98 | 672 | 405 |
| 4 | A | 1128 | 927 | 590 | 50 | 840 | 98 | 672 | 405 |
| 5 | A | 1118 | 911 | 590 | 50 | 840 | 98 | 672 | 405 |
| 6 | A | 1124 | 911 | 590 | 50 | 840 | 98 | 672 | 405 |
| 7 | A | 1106 | 920 | 590 | 50 | 840 | 98 | 672 | 405 |
| 8 | A | 1124 | 923 | 590 | 50 | 840 | 98 | 672 | 405 |
| 9 | A | 1123 | 905 | 590 | 50 | 840 | 98 | 672 | 405 |
| 10 | A | 1117 | 918 | 590 | 50 | 840 | 98 | 672 | 405 |
| 11 | A | 1133 | 905 | 590 | 50 | 840 | 98 | 672 | 405 |
| 12 | A | 1122 | 919 | 590 | 50 | 840 | 98 | 672 | 405 |
| 13 | A | 1132 | 915 | 590 | 50 | 840 | 98 | 672 | 405 |
| 14 | A | 1134 | 906 | 590 | 50 | 840 | 98 | 672 | 405 |
| 15 | A | 1111 | 916 | 590 | 50 | 840 | 98 | 672 | 405 |
| 16 | A | 1122 | 908 | 590 | 50 | 840 | 98 | 672 | 405 |
| 17 | A | 1115 | 928 | 590 | 50 | 840 | 98 | 672 | 405 |
| 18 | A | 1119 | 912 | 590 | 50 | 840 | 98 | 672 | 405 |
| 19 | A | 1123 | 906 | 650 | 50 | 840 | 98 | 672 | 405 |
| 20 | A | 1127 | 920 | 590 | 50 | 840 | 98 | 672 | 405 |
| 21 | A | 1129 | 927 | 590 | 60 | 840 | 98 | 672 | 405 |
| 22 | A | 1132 | 911 | 590 | 90 | | | *1 | |
| 23 | A | 1130 | 904 | 590 | 50 | 840 | 98 | 672 | 405 |
| 24 | A | 1109 | 926 | 590 | 50 | 840 | 98 | 672 | 405 |
| 25 | A | 1111 | 920 | 590 | 50 | 840 | 98 | 672 | 405 |
| 26 | A | 1116 | 929 | 590 | 50 | 840 | 98 | 672 | 405 |
| 27 | A | 1123 | 906 | 590 | 50 | 840 | 98 | 672 | 405 |
| 28 | A | 1134 | 902 | 590 | 50 | 840 | 98 | 672 | 405 |
| 29 | A | 1124 | 912 | 590 | 50 | 840 | 98 | 672 | 405 |
| 30 | A | 1121 | 922 | 590 | 50 | 840 | 98 | 672 | 405 |

TABLE 4

| | | Hot-rolling | | Coiling | Cold-rolling | Annealing | | Primary two-stage cooling | |
|---|---|---|---|---|---|---|---|---|---|
| Production No. | Steel No. | Heating temperature (° C.) | Finish rolling completion temperature (° C.) | Coiling temperature (° C.) | Cold-rolling reduction (%) | Annealing temperature (° C.) | Annealing time (s) | Primary cooling stop temperature (° C.) | Secondary cooling stop temperature (° C.) |
| 31 | A | 1115 | 914 | 590 | 50 | 840 | 98 | 672 | 405 |
| 32 | A | 1134 | 907 | 590 | 50 | 840 | 98 | 672 | 405 |
| 33 | A | 1110 | 904 | 590 | 50 | 840 | 98 | 672 | 405 |
| 34 | A | 1109 | 922 | 590 | 50 | 840 | 98 | 672 | 405 |
| 35 | A | 1120 | 912 | 590 | 50 | 840 | 98 | 672 | 405 |
| 36 | A | 1114 | 904 | 590 | 50 | 840 | 98 | 672 | 405 |

TABLE 4-continued

| Production No. | Steel No. | Hot-rolling Heating temperature (° C.) | Hot-rolling Finish rolling completion temperature (° C.) | Coiling Coiling temperature (° C.) | Cold-rolling Cold-rolling reduction (%) | Annealing Annealing temperature (° C.) | Annealing Annealing time (s) | Primary two-stage cooling Primary cooling stop temperature (° C.) | Primary two-stage cooling Secondary cooling stop temperature (° C.) |
|---|---|---|---|---|---|---|---|---|---|
| 37 | A | 1109 | 910 | 590 | 50 | <u>750</u> | 98 | 672 | 405 |
| 38 | A | 1125 | 913 | 590 | 50 | 840 | 98 | 672 | 405 |
| 39 | A | 1117 | 925 | 590 | 50 | 850 | 98 | 672 | 405 |
| 40 | A | 1113 | 904 | 590 | 50 | <u>1000</u> | 98 | 672 | 405 |
| 41 | A | 1135 | 923 | 590 | 50 | 840 | <u>1</u> | 672 | 405 |
| 42 | A | 1135 | 904 | 590 | 50 | 840 | 98 | 672 | 405 |
| 43 | A | 1111 | 926 | 590 | 50 | 840 | 2000 | 672 | 405 |
| 44 | A | 1126 | 922 | 590 | 50 | 840 | 98 | 672 | <u>80</u> |
| 45 | A | 1129 | 922 | 590 | 50 | 840 | 98 | 672 | 350 |
| 46 | A | 1131 | 904 | 590 | 50 | 840 | 98 | 672 | 405 |
| 47 | A | 1118 | 909 | 590 | 50 | 840 | 98 | 672 | 420 |
| 48 | A | 1119 | 921 | 590 | 50 | 840 | 98 | 672 | <u>550</u> |
| 49 | A | 1122 | 924 | 590 | 50 | 840 | 98 | 672 | 405 |
| 50 | A | 1123 | 915 | 590 | 50 | 840 | 98 | 672 | 405 |
| 51 | A | 1129 | 921 | 590 | 50 | 840 | 98 | 672 | 405 |
| 52 | <u>B</u> | | | | | *2 | | | |
| 53 | <u>C</u> | | | | | *2 | | | |
| 54 | D | 1117 | 921 | 590 | 50 | 840 | 98 | 672 | 405 |
| 55 | E | 1134 | 920 | 590 | 50 | 840 | 98 | 672 | 405 |
| 56 | <u>F</u> | | | | | *2 | | | |
| 57 | G | 1105 | 923 | 590 | 50 | 840 | 98 | 672 | 405 |
| 58 | H | 1121 | 906 | 590 | 50 | 840 | 98 | 672 | 405 |
| 59 | <u>I</u> | | | | | *2 | | | |
| 60 | J | 1112 | 918 | 590 | 50 | 840 | 98 | 672 | 405 |

TABLE 5

| Production No. | Steel No. | Hot-rolling Heating temperature (° C.) | Hot-rolling Finish rolling completion temperature (° C.) | Coiling Coiling temperature (° C.) | Cold-rolling Cold-rolling reduction (%) | Annealing Annealing temperature (° C.) | Annealing Annealing time (s) | Primary two-stage cooling Primary cooling stop temperature (° C.) | Primary two-stage cooling Secondary cooling stop temperature (° C.) |
|---|---|---|---|---|---|---|---|---|---|
| 61 | K | 1106 | 903 | 590 | 50 | 840 | 98 | 672 | 405 |
| 62 | <u>L</u> | 1123 | 928 | 590 | 50 | 840 | 98 | 672 | 405 |
| 63 | M | 1129 | 908 | 590 | 50 | 840 | 98 | 672 | 405 |
| 64 | <u>N</u> | 1125 | 908 | 590 | 50 | 840 | 98 | 672 | 405 |
| 65 | <u>O</u> | 1115 | 915 | 590 | 50 | 840 | 98 | 672 | 405 |
| 66 | P | 1114 | 912 | 590 | 50 | 840 | 98 | 672 | 405 |
| 67 | Q | 1131 | 906 | 590 | 50 | 840 | 98 | 672 | 405 |
| 68 | R | 1123 | 924 | 590 | 50 | 840 | 98 | 672 | 405 |
| 69 | S | 1125 | 904 | 590 | 50 | 840 | 98 | 672 | 405 |
| 70 | T | 1115 | 925 | 590 | 50 | 840 | 98 | 672 | 405 |
| 71 | U | 1133 | 917 | 590 | 50 | 840 | 98 | 672 | 405 |
| 72 | V | 1106 | 911 | 590 | 50 | 840 | 98 | 672 | 405 |
| 73 | <u>W</u> | | | | | *2 | | | |
| 74 | <u>X</u> | 1131 | 908 | 590 | 50 | 840 | 98 | 672 | 405 |
| 75 | Y | 1135 | 916 | 590 | 50 | 840 | 98 | 672 | 405 |
| 76 | <u>Z</u> | 1129 | 922 | 590 | 50 | 840 | 98 | 672 | 405 |
| 77 | AA | 1112 | 919 | 590 | 50 | 840 | 98 | 672 | 405 |
| 78 | <u>BB</u> | | | | | *2 | | | |
| 79 | CC | 1119 | 907 | 590 | 50 | 840 | 98 | 672 | 405 |
| 80 | <u>DD</u> | | | | | *2 | | | |
| 81 | EE | 1132 | 924 | 590 | 50 | 840 | 98 | 672 | 405 |
| 82 | FF | 1111 | 913 | 590 | 50 | 840 | 98 | 672 | 405 |
| 83 | <u>GG</u> | | | | | *2 | | | |
| 84 | HH | 1115 | 910 | 590 | 50 | 840 | 98 | 672 | 405 |
| 85 | <u>II</u> | | | | | *2 | | | |
| 86 | JJ | 1123 | 926 | 590 | 50 | 840 | 98 | 672 | 405 |
| 87 | KK | 1121 | 905 | 590 | 50 | 840 | 98 | 672 | 405 |
| 88 | LL | 1118 | 918 | 590 | 50 | 840 | 98 | 672 | 405 |
| 89 | MM | 1120 | 917 | 590 | 50 | 840 | 98 | 672 | 405 |
| 90 | <u>NN</u> | | | | | *2 | | | |
| 91 | OO | 1122 | 915 | 590 | 50 | 840 | 98 | 672 | 405 |
| 92 | PP | 1118 | 928 | 590 | 50 | 840 | 98 | 672 | 405 |
| 93 | <u>QQ</u> | | | | | *2 | | | |
| 94 | RR | 1123 | 903 | 590 | 50 | 840 | 98 | 672 | 405 |

TABLE 6

| Production No. | Plating Plating | Plating Alloying | Tempering Constant temperature retention temperature (° C.) | Tempering Constant temperature retention time (sec) | Secondary two-stage cooling Tertiary cooling rate (° C./s) | Secondary two-stage cooling Tertiary cooling stop temperature (° C.) | Secondary two-stage cooling Fourthly cooling rate (° C./s) | Secondary two-stage cooling Fourthly cooling stop temperature (° C.) |
|---|---|---|---|---|---|---|---|---|
| 1 | NO | | 405 | 285 | 12 | 355 | 16 | 92 |
| 2 | NO | | 405 | 285 | 12 | 355 | 16 | 92 |
| 3 | NO | | 405 | 285 | 12 | 355 | 16 | 92 |
| 4 | NO | | 405 | 285 | 12 | 355 | 16 | 92 |
| 5 | NO | | 405 | 285 | 12 | 355 | 16 | 92 |
| 6 | NO | | 405 | 285 | 12 | 355 | 16 | 92 |
| 7 | NO | | 405 | 285 | 12 | 355 | 16 | 92 |
| 8 | NO | | 405 | 285 | 12 | 355 | 16 | 92 |
| 9 | YES | YES | 405 | 285 | 12 | 355 | 16 | 92 |
| 10 | YES | YES | 405 | 285 | 12 | 355 | 16 | 92 |
| 11 | YES | YES | 405 | 285 | 12 | 355 | 16 | 92 |
| 12 | YES | NO | 405 | 285 | 12 | 355 | 16 | 92 |
| 13 | YES | NO | 405 | 285 | 12 | 355 | 16 | 92 |
| 14 | YES | NO | 405 | 285 | 12 | 355 | 16 | 92 |
| 15 | NO | | 405 | 285 | 12 | 355 | 16 | 92 |
| 16 | NO | | 405 | 285 | 12 | 355 | 16 | 92 |
| 17 | NO | | 405 | 285 | 12 | 355 | 16 | 92 |
| 18 | NO | | 405 | 285 | 12 | 355 | 16 | 92 |
| 19 | NO | | 405 | 285 | 12 | 355 | 16 | 92 |
| 20 | NO | | 405 | 285 | 12 | 355 | 16 | 92 |
| 21 | NO | | 405 | 285 | 12 | 355 | 16 | 92 |
| 22 | | | | | *1 | | | |
| 23 | NO | | 405 | 1 | 12 | 355 | 16 | 92 |
| 24 | NO | | 405 | 285 | 12 | 355 | 16 | 92 |
| 25 | NO | | 405 | 150 | 12 | 355 | 16 | 92 |
| 26 | NO | | 405 | 1400 | 12 | 355 | 16 | 92 |
| 27 | NO | | 405 | 285 | 1 | 355 | 16 | 92 |
| 28 | NO | | 405 | 285 | 12 | 355 | 16 | 92 |
| 29 | NO | | 405 | 285 | 75 | 355 | 16 | 92 |
| 30 | NO | | 405 | 285 | 12 | 200 | 16 | 92 |

TABLE 7

| Production No. | Plating Plating | Plating Alloying | Tempering Constant temperature retention temperature (° C.) | Tempering Constant temperature retention time (sec) | Secondary two-stage cooling Tertiary cooling rate (° C./s) | Secondary two-stage cooling Tertiary cooling stop temperature (° C.) | Secondary two-stage cooling Fourthly cooling rate (° C./s) | Secondary two-stage cooling Fourthly cooling stop temperature (° C.) |
|---|---|---|---|---|---|---|---|---|
| 31 | NO | | 405 | 285 | 12 | 355 | 16 | 92 |
| 32 | NO | | 405 | 285 | 12 | 355 | 1 | 92 |
| 33 | NO | | 405 | 285 | 12 | 355 | 16 | 92 |
| 34 | NO | | 405 | 285 | 12 | 355 | 65 | 92 |
| 35 | NO | | 405 | 285 | 12 | 355 | 16 | 92 |
| 36 | NO | | 405 | 285 | 12 | 355 | 16 | 200 |
| 37 | NO | | 405 | 285 | 12 | 355 | 16 | 92 |
| 38 | NO | | 405 | 285 | 12 | 355 | 16 | 92 |
| 39 | NO | | 405 | 285 | 12 | 355 | 16 | 92 |
| 40 | NO | | 405 | 285 | 12 | 355 | 16 | 92 |
| 41 | NO | | 405 | 285 | 12 | 355 | 16 | 92 |
| 42 | NO | | 405 | 285 | 12 | 355 | 16 | 92 |
| 43 | NO | | 405 | 285 | 12 | 355 | 16 | 92 |
| 44 | NO | | 405 | 285 | 12 | 355 | 16 | 92 |
| 45 | NO | | 405 | 285 | 12 | 355 | 16 | 92 |
| 46 | NO | | 405 | 285 | 12 | 355 | 16 | 92 |
| 47 | NO | | 405 | 285 | 12 | 355 | 16 | 92 |
| 48 | NO | | 405 | 285 | 12 | 355 | 16 | 92 |
| 49 | NO | | 150 | 285 | 12 | 355 | 16 | 92 |
| 50 | NO | | 405 | 285 | 12 | 355 | 16 | 92 |
| 51 | NO | | 550 | 285 | 12 | 355 | 16 | 92 |
| 52 | | | | | *2 | | | |
| 53 | | | | | *2 | | | |
| 54 | NO | | 405 | 285 | 12 | 355 | 16 | 92 |
| 55 | NO | | 405 | 285 | 12 | 355 | 16 | 92 |
| 56 | | | | | *2 | | | |

TABLE 7-continued

|  |  | Plating | Tempering | | Secondary two-stage cooling | | | |
|---|---|---|---|---|---|---|---|---|
| Production No. | Plating | Alloying | Constant temperature retention temperature (° C.) | Constant temperature retention time (sec) | Tertiary cooling rate (° C./s) | Tertiary cooling stop temperature (° C.) | Fourthly cooling rate (° C./s) | Fourthly cooling stop temperature (° C.) |
| 57 | NO |  | 405 | 285 | 12 | 355 | 16 | 92 |
| 58 | NO |  | 405 | 285 | 12 | 355 | 16 | 92 |
| 59 |  |  |  | *2 |  |  |  |  |
| 60 | NO |  | 405 | 285 | 12 | 355 | 16 | 92 |

TABLE 8

|  | Plating | | Tempering | | Secondary two-stage cooling | | | |
|---|---|---|---|---|---|---|---|---|
| Production No. | Plating | Alloying | Constant temperature retention temperature (° C.) | Constant temperature retention time (sec) | Tertiary cooling rate (° C./s) | Tertiary cooling stop temperature (° C.) | Fourthly cooling rate (° C./s) | Fourthly cooling stop temperature (° C.) |
| 61 | NO |  | 405 | 285 | 12 | 355 | 16 | 92 |
| 62 | NO |  | 405 | 285 | 12 | 355 | 16 | 92 |
| 63 | NO |  | 405 | 285 | 12 | 355 | 16 | 92 |
| 64 | NO |  | 405 | 285 | 12 | 355 | 16 | 92 |
| 65 | NO |  | 405 | 285 | 12 | 355 | 16 | 92 |
| 66 | NO |  | 405 | 285 | 12 | 355 | 16 | 92 |
| 67 | NO |  | 405 | 285 | 12 | 355 | 16 | 92 |
| 68 | NO |  | 405 | 285 | 12 | 355 | 16 | 92 |
| 69 | NO |  | 405 | 285 | 12 | 355 | 16 | 92 |
| 70 | NO |  | 405 | 285 | 12 | 355 | 16 | 92 |
| 71 | NO |  | 405 | 285 | 12 | 355 | 16 | 92 |
| 72 | NO |  | 405 | 285 | 12 | 355 | 16 | 92 |
| 73 |  |  |  | *2 |  |  |  |  |
| 74 | NO |  | 405 | 285 | 12 | 355 | 16 | 92 |
| 75 | NO |  | 405 | 285 | 12 | 355 | 16 | 92 |
| 76 | NO |  | 405 | 285 | 12 | 355 | 16 | 92 |
| 77 | NO |  | 405 | 285 | 12 | 355 | 16 | 92 |
| 78 |  |  |  | *2 |  |  |  |  |
| 79 | NO |  | 405 | 285 | 12 | 355 | 16 | 92 |
| 80 |  |  |  | *2 |  |  |  |  |
| 81 | NO |  | 405 | 285 | 12 | 355 | 16 | 92 |
| 82 | NO |  | 405 | 285 | 12 | 355 | 16 | 92 |
| 83 |  |  |  | *2 |  |  |  |  |
| 84 | NO |  | 405 | 285 | 12 | 355 | 16 | 92 |
| 85 |  |  |  | *2 |  |  |  |  |
| 86 | NO |  | 405 | 285 | 12 | 355 | 16 | 92 |
| 87 | NO |  | 405 | 285 | 12 | 355 | 16 | 92 |
| 88 | NO |  | 405 | 285 | 12 | 355 | 16 | 92 |
| 89 | NO |  | 405 | 285 | 12 | 355 | 16 | 92 |
| 90 |  |  |  | *2 |  |  |  |  |
| 91 | NO |  | 405 | 285 | 12 | 355 | 16 | 92 |
| 92 | NO |  | 405 | 285 | 12 | 355 | 16 | 92 |
| 93 |  |  |  | *2 |  |  |  |  |
| 94 | NO |  | 405 | 285 | 12 | 355 | 16 | 92 |

From the obtained steel sheets, the volume ratios of tempered martensite (structure A volume ratios), the total volume ratios of one or both of ferrite and bainite (structure B volume ratios), the total volume ratios of residual austenite, fresh martensite, and pearlite (structure C volume ratios), the number densities of iron-based carbides in tempered martensite (carbide number densities), and the ratios of the number of ε-type carbides with respect to the number of iron-based carbides in tempered martensite (the ratios of ε-type carbide) were obtained. Furthermore, the tensile strengths (TS), total elongations (EL), and hole expansibility (k) of the obtained steel sheets were measured, and the delayed fracture resistance properties of the obtained steel sheets were evaluated.

Regarding the tensile strength and the elongation, a JIS No. 5 test piece perpendicularly to the rolling direction was sampled from each of the steel sheets, a tensile test was carried out according to JIS Z 2242, and the tensile strength (TS) and the total elongation (El) were measured. Regarding the hole expansibility, the hole expansion percentage (λ(%)) was measured according to The Japan Iron and Steel Federation's standard JFS T1001. Reference Sign "*3" in the tables indicates that cracking was occurred and thus TS, EL, and λ were not evaluated.

The delayed fracture resistance properties of the steel sheet was evaluated by bending a strip-shaped test piece having a length of 100 mm, a width of 30 mm, and a thickness of 1.3 mm or 1.6 mm, which was cut out perpendicularly to the rolling direction of the steel sheet, at three points, mounting a water-resistant strain gauge on the surface of the strip-shaped test piece, then, intruding hydrogen into the strip-shaped test piece by immersing the strip-shaped test piece in an aqueous solution of thiocyan ammonium and electrolyzing the aqueous solution of thiocyan ammonium at a current density of 0.1 mA/cm$^2$, and, after two hours, confirming the presence and absence of the occurrence of cracking.

The radius of the bending processing of the strip-shaped test piece was set to 10 mm. The applied stress imparted to the strip-shaped test piece having a thickness of 1.3 mm was set to 60% of the tensile strength (TS) of the steel sheet, and the applied stress imparted to the strip-shaped test piece having a thickness of 1.6 mm was set to 90% of the tensile strength (TS) of the steel sheet. Strip-shaped test pieces that were broken at the applied stress of 60% of the tensile strength (TS) were evaluated as "VERY BAD" (VB), strip-shaped test pieces that were not broken at the applied stress of 60% of the tensile strength (TS), but broken at the applied stress of 90% of the tensile strength (TS) were evaluated as "BAD" (B), and strip-shaped test pieces that were not broken at both applied stresses were evaluated as "GOOD" (G). Steel sheets evaluated as "GOOD" are steel sheets having excellent delayed fracture resistance properties.

TABLE 9

| | Structure at thickness ¼ portion | | | | | Evaluation | | | | |
|---|---|---|---|---|---|---|---|---|---|---|
| Production No. | Structure A volume ratio (%) | Structure B volume ratio (%) | Structure C volume ratio (%) | Number density of carbides (10$^6$ particles/mm$^2$) | Ratio of ε-type carbide (%) | TS (MPa) | EL (%) | λ (%) | Delayed fracture resistance property | Note |
| 1 | 45 | 48 | 7 | 50 | 60 | 1015 | 20 | 60 | G | Example |
| 2 | 45 | 48 | 7 | 50 | 60 | 1015 | 20 | 60 | G | Example |
| 3 | 45 | 48 | 7 | 50 | 60 | 1015 | 20 | 60 | G | Example |
| 4 | 45 | 48 | 7 | 50 | 60 | 1015 | 20 | 60 | G | Example |
| 5 | 45 | 48 | 7 | 50 | 60 | 1015 | 20 | 60 | G | Example |
| 6 | 45 | 48 | 7 | 50 | 60 | 1015 | 20 | 60 | G | Example |
| 7 | 45 | 48 | 7 | 50 | 60 | 1015 | 20 | 60 | G | Example |
| 8 | 45 | 48 | 7 | 50 | 60 | 1015 | 20 | 60 | G | Example |
| 9 | 45 | 48 | 7 | 50 | 60 | 1015 | 20 | 60 | G | Example |
| 10 | 45 | 48 | 7 | 50 | 60 | 1015 | 20 | 60 | G | Example |
| 11 | 45 | 48 | 7 | 50 | 60 | 1015 | 20 | 60 | G | Example |
| 12 | 45 | 48 | 7 | 50 | 60 | 1015 | 20 | 60 | G | Example |
| 13 | 45 | 48 | 7 | 50 | 60 | 1015 | 20 | 60 | G | Example |
| 14 | 45 | 48 | 7 | 50 | 60 | 1015 | 20 | 60 | G | Example |
| 15 | 45 | 48 | 7 | 50 | 60 | 1015 | 20 | 60 | G | Example |
| 16 | 45 | 48 | 7 | 50 | 60 | 1015 | 20 | 60 | G | Example |
| 17 | 45 | 48 | 7 | 50 | 60 | 1015 | 20 | 60 | G | Example |
| 18 | 45 | 48 | 7 | 50 | 60 | 1015 | 20 | 60 | G | Example |
| 19 | 60 | 32 | 8 | 100 | 70 | 1060 | 21 | 65 | G | Example |
| 20 | 45 | 48 | 7 | 50 | 60 | 1015 | 20 | 60 | G | Example |
| 21 | 60 | 32 | 8 | 100 | 70 | 1060 | 21 | 65 | G | Example |
| 22 | | | | *1 | | | | | | Comparative Example |
| 23 | 10 | 48 | 42 | 0.5 | 5 | 1280 | 20 | 60 | VB | Comparative Example |
| 24 | 45 | 48 | 7 | 50 | 60 | 1015 | 20 | 60 | G | Example |
| 25 | 45 | 48 | 7 | 50 | 60 | 1015 | 20 | 60 | G | Example |
| 26 | 45 | 48 | 7 | 50 | 60 | 1015 | 20 | 60 | G | Example |
| 27 | 45 | 48 | 7 | 50 | 5 | 1015 | 20 | 60 | VB | Comparative Example |
| 28 | 45 | 48 | 7 | 50 | 60 | 1015 | 20 | 60 | G | Example |
| 29 | 45 | 48 | 7 | 0.5 | 5 | 1015 | 20 | 60 | VB | Comparative Example |
| 30 | 45 | 48 | 7 | 50 | 5 | 1015 | 20 | 60 | VB | Comparative Example |

TABLE 10

| | Structure at thickness ¼ portion | | | | | Evaluation | | | | |
|---|---|---|---|---|---|---|---|---|---|---|
| Production No. | Structure A volume ratio (%) | Structure B volume ratio (%) | Structure C volume ratio (%) | Number density of carbides (10$^6$ particles/mm$^2$) | Ratio of ε-type carbide (%) | TS (MPa) | EL (%) | λ (%) | Delayed fracture resistance property | Note |
| 31 | 45 | 48 | 7 | 50 | 60 | 1015 | 20 | 60 | G | Example |
| 32 | 45 | 48 | 7 | 50 | 5 | 1015 | 20 | 60 | VB | Comparative Example |
| 33 | 45 | 48 | 7 | 50 | 60 | 1015 | 20 | 60 | G | Example |
| 34 | 45 | 48 | 7 | 0.5 | 5 | 1015 | 20 | 60 | VB | Comparative Example |
| 35 | 45 | 48 | 7 | 50 | 60 | 1015 | 20 | 60 | G | Example |
| 36 | 45 | 48 | 7 | 50 | 5 | 1015 | 20 | 60 | VB | Comparative Example |
| 37 | 10 | 82 | 8 | 0.5 | 60 | 460 | 20 | 60 | VB | Comparative Example |
| 38 | 45 | 48 | 7 | 50 | 60 | 1015 | 20 | 60 | G | Example |
| 39 | 60 | 32 | 8 | 100 | 70 | 1060 | 21 | 65 | G | Example |
| 40 | 80 | 13 | 7 | 50 | 60 | *3 | | | G | Comparative Example |
| 41 | 10 | 82 | 8 | 0.5 | 60 | 460 | 20 | 60 | VB | Comparative Example |
| 42 | 45 | 48 | 7 | 50 | 60 | 1015 | 20 | 60 | G | Example |
| 43 | 45 | 48 | 7 | 50 | 60 | 1350 | 5 | 60 | G | Example |
| 44 | 45 | 5 | 50 | 50 | 60 | *3 | | | G | Comparative Example |

TABLE 10-continued

| Production No. | Structure A volume ratio (%) | Structure B volume ratio (%) | Structure C volume ratio (%) | Number density of carbides (10⁶ particles/mm²) | Ratio of ε-type carbide (%) | TS (MPa) | EL (%) | λ (%) | Delayed fracture resistance property | Note |
|---|---|---|---|---|---|---|---|---|---|---|
| 45 | 45 | 48 | 7 | 50 | 60 | 1015 | 20 | 60 | G | Example |
| 46 | 45 | 48 | 7 | 50 | 60 | 1015 | 20 | 60 | G | Example |
| 47 | 45 | 48 | 7 | 50 | 60 | 1015 | 20 | 60 | G | Example |
| 48 | 45 | _5_ | _50_ | 50 | 60 | | *3 | | G | Comparative Example |
| 49 | 45 | 48 | 7 | _0.5_ | 60 | 1015 | 20 | 60 | VB | Comparative Example |
| 50 | 45 | 48 | 7 | 50 | 60 | 1015 | 20 | 60 | G | Example |
| 51 | _10_ | _82_ | 8 | _0.5_ | _5_ | _460_ | 20 | 60 | VB | Comparative Example |
| 52 | | | | *2 | | | | | | Comparative Example |
| 53 | | | | *2 | | | | | | Comparative Example |
| 54 | 45 | 48 | 7 | 50 | 60 | 1015 | 20 | 60 | G | Example |
| 55 | 60 | 32 | 8 | 100 | 70 | 1060 | 21 | 65 | G | Example |
| 56 | | | | *2 | | | | | | Comparative Example |
| 57 | 45 | 48 | 7 | 50 | 60 | 1015 | 20 | 60 | G | Example |
| 58 | 60 | 32 | 8 | 100 | 70 | 1060 | 21 | 65 | G | Example |
| 59 | | | | *2 | | | | | | Comparative Example |
| 60 | 45 | 48 | 7 | 50 | 60 | 1015 | 20 | 60 | G | Example |

TABLE 11

| Production No. | Structure A volume ratio (%) | Structure B volume ratio (%) | Structure C volume ratio (%) | Number density of carbides (10⁶ particles/mm²) | Ratio of ε-type carbide (%) | TS (MPa) | EL (%) | λ (%) | Delayed fracture resistance property | Note |
|---|---|---|---|---|---|---|---|---|---|---|
| 61 | 60 | 32 | 8 | 100 | 70 | 1060 | 21 | 65 | G | Example |
| 62 | _10_ | _82_ | 8 | _0.5_ | 60 | _460_ | 20 | 60 | VB | Comparative Example |
| 63 | 60 | 32 | 8 | 100 | 70 | 1060 | 21 | 65 | G | Example |
| 64 | _10_ | 70 | _20_ | 100 | 55 | _460_ | 15 | 50 | VB | Comparative Example |
| 65 | 45 | 48 | 7 | _0.5_ | 60 | 1015 | 20 | 60 | VB | Comparative Example |
| 66 | 45 | 48 | 7 | 50 | 60 | 1015 | 20 | 60 | G | Example |
| 67 | 60 | 32 | 8 | 100 | 70 | 1060 | 21 | 65 | G | Example |
| 68 | 45 | 48 | 7 | 50 | 60 | 1015 | 20 | 60 | G | Example |
| 69 | 60 | 32 | 8 | 100 | 70 | 1060 | 21 | 65 | G | Example |
| 70 | 45 | 48 | 7 | 50 | 60 | 1015 | 20 | 60 | G | Example |
| 71 | 60 | 32 | 8 | 100 | 70 | 1060 | 21 | 65 | G | Example |
| 72 | 60 | 32 | 8 | 100 | 70 | 1060 | 21 | 65 | G | Example |
| 73 | | | | *2 | | | | | | Comparative Example |
| 74 | 45 | 48 | 7 | 50 | 60 | 1015 | 20 | 60 | G | Example |
| 75 | 60 | 32 | 8 | 100 | 70 | 1060 | 21 | 65 | G | Example |
| 76 | _10_ | _82_ | 8 | _0.5_ | 60 | _460_ | 20 | 60 | VB | Comparative Example |
| 77 | 60 | 32 | 8 | 100 | 70 | 1060 | 21 | 65 | G | Example |
| 78 | | | | *2 | | | | | | Comparative Example |
| 79 | 60 | 32 | 8 | 100 | 70 | 1060 | 21 | 65 | G | Example |
| 80 | | | | *2 | | | | | | Comparative Example |
| 81 | 60 | 32 | 8 | 100 | 70 | 1060 | 21 | 65 | G | Example |
| 82 | 60 | 32 | 8 | 100 | 70 | 1060 | 21 | 65 | G | Example |
| 83 | | | | *2 | | | | | | Comparative Example |
| 84 | 60 | 32 | 8 | 100 | 70 | 1060 | 21 | 65 | G | Example |
| 85 | | | | *2 | | | | | | Comparative Example |
| 86 | 45 | 48 | 7 | 50 | 60 | 1015 | 20 | 60 | G | Example |
| 87 | 45 | 48 | 7 | 50 | 60 | 1015 | 20 | 60 | G | Example |
| 88 | 45 | 48 | 7 | 50 | 60 | 1015 | 20 | 60 | G | Example |
| 89 | 60 | 32 | 8 | 100 | 70 | 1060 | 21 | 65 | G | Example |
| 90 | | | | *2 | | | | | | Comparative Example |
| 91 | 45 | 48 | 7 | 50 | 60 | 1015 | 20 | 60 | G | Example |
| 92 | 60 | 32 | 8 | 100 | 70 | 1060 | 21 | 65 | G | Example |
| 93 | | | | *2 | | | | | | Comparative Example |
| 94 | 60 | 32 | 8 | 100 | 70 | 1060 | 21 | 65 | G | Example |

As shown in the tables, it is found that, in the steel sheets of the examples of the present invention, a large amount of the precipitated iron-based carbide functions as a hydrogen trap site, and thus the delayed fracture resistance properties are significantly excellent, and the formability is also excellent with the phase constitution in the structure. In addition, it is found that, in the steel sheets of the comparative examples, at least any of the strength, the delayed fracture resistance properties, and the formability is poor.

INDUSTRIAL APPLICABILITY

As described above, according to the present invention, it is possible to provide a steel sheet, a hot-dip galvanized steel sheet, and a galvannealed steel sheet which are preferable as structural members for vehicles, buildings, home electric appliances, and the like and has a tensile strength of 780 MPa or higher and an excellent delayed fracture resistance properties, and manufacturing methods therefor. Therefore, the present invention is highly available in industries for producing and using structural members.

What is claimed is:

1. A steel sheet, comprising, as chemical composition, by mass %:
C: 0.05% to 0.40%,
Si: 0.05% to 3.00%,
Mn: 1.50% or more and less than 3.50%,
P: 0.04% or less,
S: 0.01% or less,
N: 0.01% or less,
O: 0.006% or less,
Al: 0% to 2.00%,
Cr: 0% to 1.00%,
Mo: 0% to 1.00%,
Ni: 0% to 1.00%,
Cu: 0% to 1.00%
Nb: 0% to 0.30%,
Ti: 0% to 0.30%,
V: 0% to 0.50%
B: 0% to 0.01%
Ca: 0% to 0.04%,
Mg: 0% to 0.04%,
REM: 0% to 0.04%, and
a remainder comprising Fe and impurities,
wherein a structure at a thickness ¼ portion includes, in terms of volume ratios,
tempered martensite: 30% to 70% and
one or both of ferrite and bainite: a total of 20% to 70%,
wherein in the structure at the thickness ¼ portion, a volume ratio of residual austenite is less than 10%, a volume ratio of fresh martensite is 10% or less, a volume ratio of pearlite is 10% or less, and a total volume ratio of the residual austenite, the fresh martensite, and the pearlite is 15% or less,
wherein a number density of iron-based carbides having a major axis of 5 nm or more in the tempered martensite at the thickness ¼ portion is $5 \times 10^7$ particles/$mm^2$ or more,
wherein a ratio of the number of c-type carbides with respect to the number of the iron-based carbides having the major axis of 5 nm or more at the thickness ¼ portion is 20% or more, and
wherein a tensile strength is 780 MPa or higher.

2. The steel sheet according to claim 1,
wherein the chemical composition of the steel sheet includes, by mass %, one or more selected from the group consisting of
Cr: 0.05% to 1.00%,
Mo: 0.01% to 1.00%,
Ni: 0.05% to 1.00%, and
Cu: 0.05% to 1.00%.

3. The steel sheet according to claim 1,
wherein the chemical composition of the steel sheet includes, by mass %, one or more selected from the group consisting of
Nb: 0.005% to 0.30%,
Ti: 0.005% to 0.30%, and
V: 0.005% to 0.50%.

4. The steel sheet according to claim 1,
wherein the chemical composition of the steel sheet includes, by mass %,
B: 0.0001% to 0.01%.

5. The steel sheet according to claim 1,
wherein the chemical composition of the steel sheet includes, by mass %, one or more selected from the group consisting of
Ca: 0.0005% to 0.04%,
Mg: 0.0005% to 0.04%, and
REM: 0.0005% to 0.04%.

6. The steel sheet according to claim 1,
wherein an average major axis of the iron-based carbides is 350 nm or less.

7. A hot-dip galvanized steel sheet,
wherein a hot-dip galvanized layer including 15 mass % or less of Fe and a remainder comprising Zn, Al, and impurities is formed on a surface of the steel sheet according to claim 1.

8. A galvannealed steel sheet,
wherein a galvannealed layer including 15 mass % or less of Fe and a remainder comprising Zn, Al, and impurities is formed on a surface of the steel sheet according to claim 1.

* * * * *

UNITED STATES PATENT AND TRADEMARK OFFICE
CERTIFICATE OF CORRECTION

PATENT NO. : 10,822,672 B2  
APPLICATION NO. : 15/743398  
DATED : November 3, 2020  
INVENTOR(S) : Yuri Toda et al.

Page 1 of 1

It is certified that error appears in the above-identified patent and that said Letters Patent is hereby corrected as shown below:

On the Title Page

Please amend the Title item (54) and in the Specification at Column 1, Lines 1-5:
"STEEL SHEET, HOT-DIP GALVANIZED STEEL SHEET, GALVANIZED STEEL SHEET, AND MANUFACTURING METHODS THEREFOR"
To:
-- STEEL SHEET, HOT-DIP GALVANIZED STEEL SHEET, GALVANNEALED STEEL SHEET, AND MANUFACTURING METHODS THEREFOR --.

Signed and Sealed this  
Twelfth Day of January, 2021

Andrei Iancu  
*Director of the United States Patent and Trademark Office*